US011192265B2

(12) United States Patent
Martin et al.

(10) Patent No.: US 11,192,265 B2
(45) Date of Patent: Dec. 7, 2021

(54) SYSTEM AND METHOD FOR A ROBOTIC MANIPULATOR SYSTEM

(71) Applicant: Veolia Nuclear Solutions, Inc., Westminster, CO (US)

(72) Inventors: Scott Martin, Westminster, CO (US); Paul Linnebur, Westminster, CO (US); Marc Rood, Westminster, CO (US); Matt Denver Cole, Westminster, CO (US)

(73) Assignee: Veolia Nuclear Solutions, Inc., Westminster, CO (US)

( * ) Notice: Subject to any disclaimer, the term of this patent is extended or adjusted under 35 U.S.C. 154(b) by 287 days.

(21) Appl. No.: 16/506,171

(22) Filed: Jul. 9, 2019

(65) Prior Publication Data

US 2019/0329426 A1  Oct. 31, 2019

Related U.S. Application Data

(63) Continuation of application No. 15/591,978, filed on May 10, 2017, now Pat. No. 10,384,353.

(60) Provisional application No. 62/337,066, filed on May 16, 2016.

(51) Int. Cl.
*B25J 18/02* (2006.01)
*B25J 9/04* (2006.01)
*B25J 9/16* (2006.01)
*B25J 13/08* (2006.01)
*B25J 9/00* (2006.01)

(52) U.S. Cl.
CPC .......... *B25J 18/025* (2013.01); *B25J 9/0018* (2013.01); *B25J 9/045* (2013.01); *B25J 9/1676* (2013.01); *B25J 13/086* (2013.01); *B25J 13/088* (2013.01); *G05B 2219/39226* (2013.01)

(58) Field of Classification Search
CPC ...... B25J 9/1676; B25J 13/086; B25J 13/088; B25J 18/025; B25J 9/0018; B25J 9/045; B25J 9/1666; G05B 2219/39226
See application file for complete search history.

(56) References Cited

U.S. PATENT DOCUMENTS

| 4,523,884 A | 6/1985 | Clement et al. |
| 4,606,695 A | 8/1986 | Lenz |
| 5,040,427 A | 8/1991 | Tanita et al. |

(Continued)

FOREIGN PATENT DOCUMENTS

| JP | 02271140 | 11/1990 |
| WO | 2013/164622 A1 | 11/2013 |

OTHER PUBLICATIONS

European Patent Office Extended Search Report for Application No. 19185233.4 dated Nov. 15, 2019 (7 pages).

(Continued)

*Primary Examiner* — Dale Moyer
(74) *Attorney, Agent, or Firm* — Holland & Hart LLP

(57) ABSTRACT

A robotic arm control system including a robotic arm configured to deploy one or more tools in an operating space, one or more sensors, and a control system operably configured to: scan the operating space with the one or more sensors, identify a surface of the operating space based at least in part upon information sensed by the one or more sensors, establish a virtual barrier offset from the surface, and limit movement of the robotic arm based at least in part upon the virtual barrier.

20 Claims, 23 Drawing Sheets

(56) References Cited

U.S. PATENT DOCUMENTS

| | | | |
|---|---|---|---|
| 5,155,423 A | 10/1992 | Karlen et al. | |
| 5,155,426 A | 10/1992 | Kurami | |
| 5,762,467 A | 6/1998 | Sturm, Jr. et al. | |
| 6,645,196 B1 | 11/2003 | Nixon et al. | |
| 7,725,162 B2* | 5/2010 | Malackowski | A61B 34/20 |
| | | | 600/424 |
| 2001/0045807 A1 | 11/2001 | McConnell et al. | |
| 2002/0007997 A1 | 1/2002 | Kundermann et al. | |
| 2004/0128026 A1* | 7/2004 | Harris | A61B 34/76 |
| | | | 700/245 |
| 2005/0053909 A1 | 3/2005 | Chan | |
| 2006/0142657 A1* | 6/2006 | Quaid | A61B 34/10 |
| | | | 600/424 |
| 2010/0153076 A1* | 6/2010 | Bellettre | G16Z 99/00 |
| | | | 703/2 |
| 2012/0221274 A1 | 8/2012 | Furukawa | |
| 2014/0276943 A1* | 9/2014 | Bowling | A61B 90/03 |
| | | | 606/130 |
| 2014/0276950 A1 | 9/2014 | Smaby et al. | |
| 2015/0185846 A1* | 7/2015 | Otto | G06F 3/016 |
| | | | 345/156 |
| 2015/0367507 A1 | 12/2015 | Egawa et al. | |
| 2016/0176044 A1 | 6/2016 | Cole et al. | |
| 2016/0338782 A1* | 11/2016 | Bowling | A61B 34/32 |
| 2016/0343273 A1* | 11/2016 | Stuart | B25J 9/1676 |
| 2017/0120442 A1 | 5/2017 | Frei et al. | |
| 2017/0150975 A1* | 6/2017 | Bozung | A61B 17/1626 |
| 2017/0316844 A1 | 11/2017 | Riesenweber et al. | |

OTHER PUBLICATIONS

Partial European Search Report; App. No. 17171034.6; dated Nov. 22, 2017, pp. 1-11.

\* cited by examiner

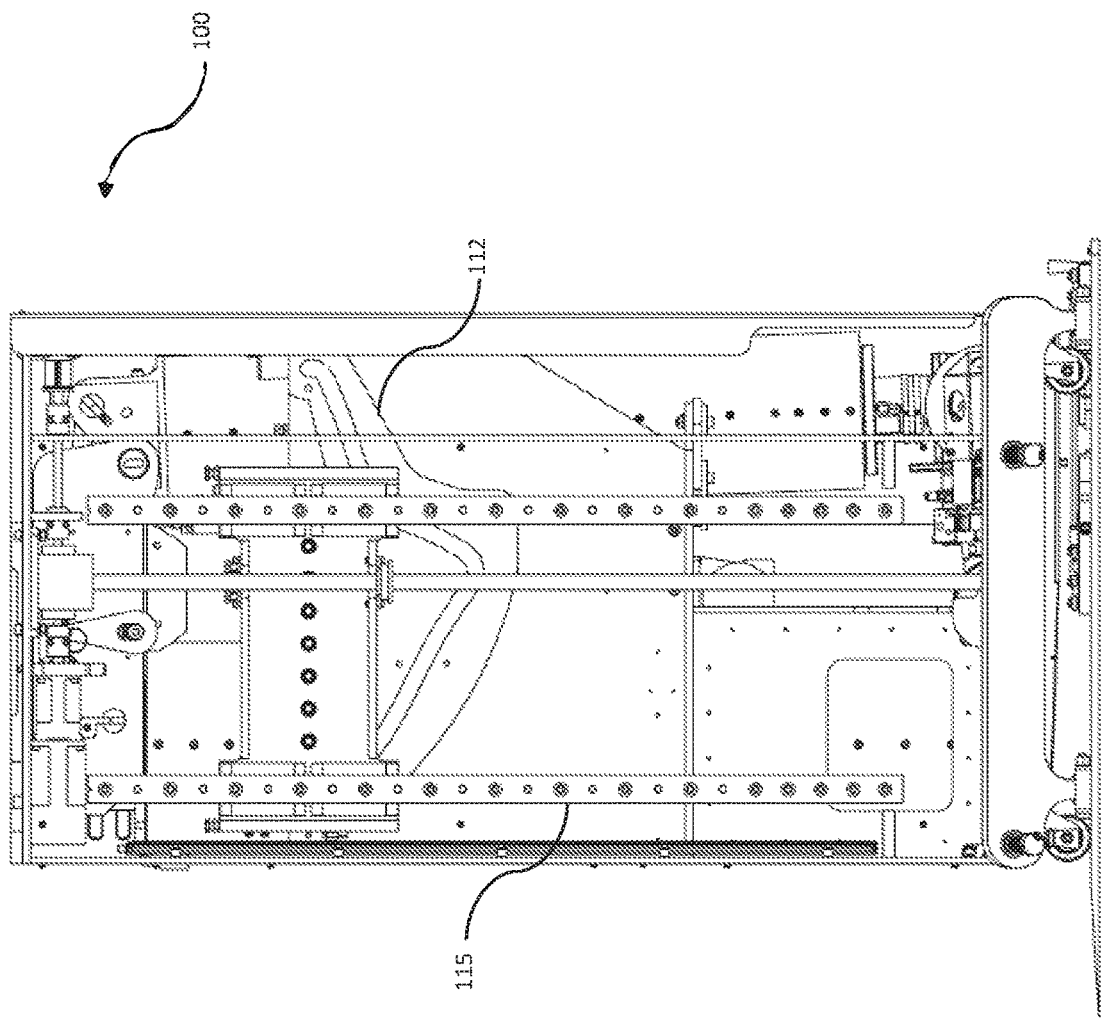

SYSTEM AND METHOD FOR A ROBOTIC MANIPULATOR SYSTEM

RELATED FILINGS

The following application claims priority to U.S. Provisional Application Ser. No. 62/337,066, filed May 16, 2016 and U.S. patent application Ser. No. 15/591,978, filed on May 10, 2017, which are incorporated by reference in their entirety.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

TECHNICAL FIELD OF THE INVENTION

This disclosure relates generally to robotic systems designed to perform operations in hazardous and/or difficult to access spaces.

BACKGROUND

Certain industrial project environments are hazardous to humans, and generally require workers to wear protective clothing and a breathing apparatus to enter and work in the area. Also, the space or area for certain projects is often not designed with human movement in mind, meaning the space can be too small, too hot, too cold, or generally difficult or impossible for humans to navigate. Some industrial project areas are so hazardous and difficult to access that human entry and repairs are altogether unfeasible. To gain access to such areas, and to reduce human exposure to hazardous conditions, remote robotic manipulators are a necessity.

Currently, most off-the-shelf remote manipulators are built for a specific need and are limited in capabilities and versatility. Therefore, a need exists for an all-in-one manipulator with increased capability, versatility, and reliability for carrying out operations in difficult to access and/or hazardous spaces.

To reduce the complexity and length of the Detailed Specification, Applicant(s) herein expressly incorporate(s) by reference the following materials identified in each paragraph below. The incorporated materials are not necessarily "prior art" and Applicant(s) expressly reserve(s) the right to swear behind any of the incorporated materials.

System and Method for a Robotic Manipulator Arm, Ser. No. 62/337,066 filed May 16, 2016, which is hereby incorporated by reference in its entirety, and to which the present application claims priority.

Tank Cleaning System, Ser. No. 62/330,330 filed May 2, 2016, which is hereby incorporated by reference in its entirety.

Systems and Methods for Chain Joint Cable Routing, Ser. No. 14/975,544 filed Dec. 18, 2015, with a priority date of Dec. 19, 2014, which is hereby incorporated by reference in its entirety.

System and Method for Inspection and Maintenance of Hazardous Spaces, Ser. No. 15/341,985 filed Nov. 2, 2016, with a priority date of Nov. 3, 2015, which is hereby incorporated by reference in its entirety.

Rolatube Deployment Mechanism, Ser. No. 62/406,209 filed Oct. 10, 2016, which is hereby incorporated by reference in its entirety.

Applicant(s) believe(s) that the material incorporated above is "non-essential" in accordance with 37 CFR 1.57, because it is referred to for purposes of indicating the background or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, tern, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the systems, methods, processes, and/or apparatuses disclosed herein. To the contrary, if the provisions of 35 § 112, ¶6 are sought to be invoked to define the embodiments, the claims will specifically and expressly state the exact phrases "means for" or "step for, and will also recite the word "function" (i.e., will state "means for performing the function of . . . "), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed embodiments, it is intended that the embodiments not be limited only to the specific structure, material or acts that are described in the preferred embodiments, but in addition, include any and all structures, materials or acts that perform the claimed function as described in alternative embodiments or forms, or that are well known present or later-developed, equivalent structures, material or acts for performing the claimed function.

BRIEF DESCRIPTION OF THE DRAWINGS

A more complete understanding of the systems, methods, processes, and/or apparatuses disclosed herein may be derived by referring to the detailed description when considered in connection with the following illustrative figures. In the figures, like-reference numbers refer to like-elements or acts throughout the figures.

FIG. 2B is a side view of the internal components of the un-deployed RMA embodiment of FIG. 2A.

Figure 1:
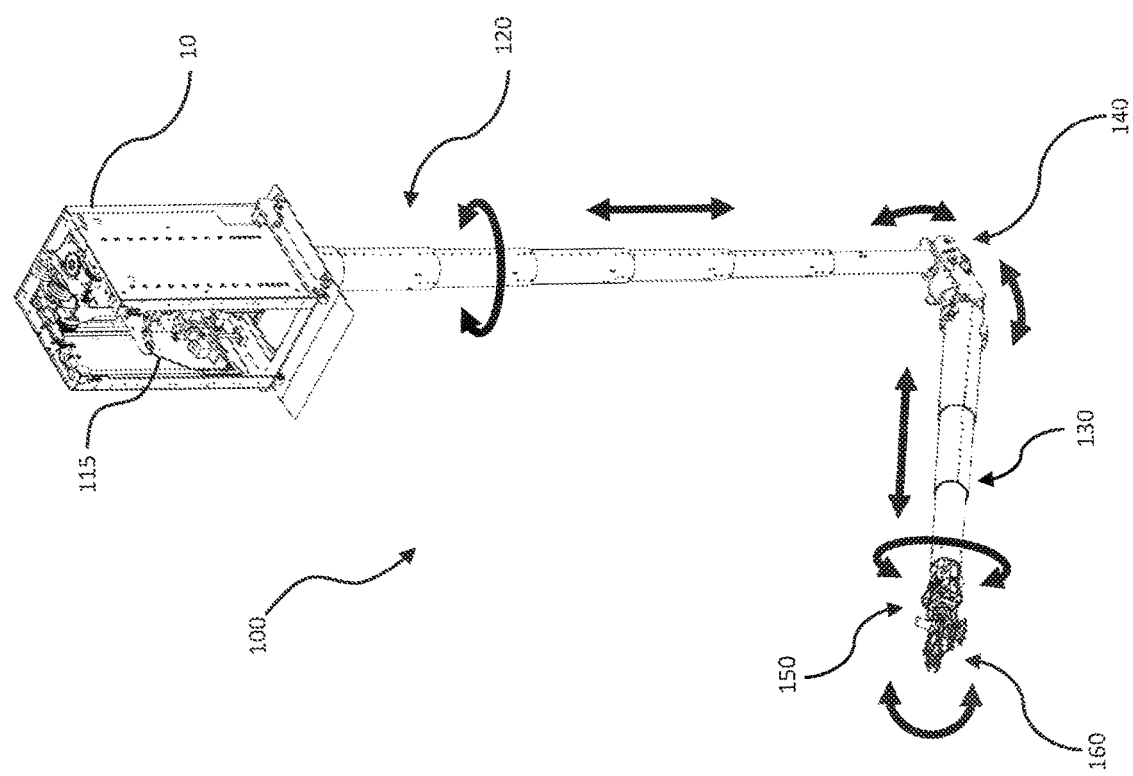
FIG. 1 depicts an isometric view of an embodiment of a deployed Robotic Manipulator Arm (RMA).

Elements and acts in the figures are illustrated for simplicity and have not necessarily been rendered according to any particular sequence or embodiment.

DESCRIPTION

In the following description, and for the purposes of explanation, numerous specific details, process durations, and/or specific formula values are set forth in order to provide a thorough understanding of the various aspects of exemplary embodiments. It will be understood, however, by those skilled in the relevant arts, that the apparatus, systems, and methods herein may be practiced without these specific details, process durations, and/or specific formula values. It is to be understood that other embodiments may be utilized and structural and functional changes may be made without departing from the scope of the apparatus, systems, and methods herein. In other instances, known structures and devices are shown or discussed more generally to avoid obscuring the exemplary embodiments. In many cases, a description of the operation is sufficient to enable one to implement the various forms, particularly when the operation is to be implemented in software. It should be noted that there are many different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized and structural and functional changes may be made without departing from the scope.

To prevent workers from needing to enter environments that are hazardous or within confined or difficult to reach spaces, a remotely operable robotic manipulator arm (RMA) is disclosed. The RMA may be used to remotely inspect, maintain, and clean difficult to access and/or hazardous spaces of a variety of different shapes, sizes, and technical constraints with little to no direct human interaction required. The RMA is versatile, durable, reusable, decreases operational risk, and increases operator safety. In some embodiments, the RMA may be one or more of radiation resistant, temperature tolerant, freeze protected, humidity tolerant, chemical resistant, and seismic/wind/weather tolerant, among others.

The RMA in some embodiments is designed and configured such that it can be transported and installed in existing locations without affecting pre-existing infrastructure or requiring heavy machinery. In some embodiments, the RMA may be installed and deployed within extremely tight quarters. In some embodiments deployment of the RMA does not require expensive or specialized tooling. During deployment and retrieval, the RMA carriage in some embodiments may follow a specific cam path allowing the manipulator to travel vertically up and down through an access point. Manual deployment in some embodiments can be carried out quickly and efficiently, limiting worker exposure to the area of operations. After the RMA has completed operations, it may be washed down on site, retrieved from the workspace, and may be removed from the site in the reverse order in which it was installed. The RMA may be redeployed at the same or other sites.

The terms "site", "tank", "compartment", "hazardous space", "workspace", "area of operations", "confined space", and other such references are merely used to reference a space within which the system may perform operations and are not intended as limitations.

The workspace in some embodiments may variously contain one or more of ion exchange resin, sludge, effluent, toxic waste, and other potentially hazardous and/or difficult to remove materials. In some embodiments, the purpose of the RMA is to facilitate the necessary operations to inspect workspaces, remove any remaining materials, clean the workspace, and install or uninstall devices in the space, among other operations. The RMA may allow for the attachment of various standard and/or customized tools that may be maneuvered within workspaces to carry out a variety of differing operations. In an example embodiment, the RMA can remove bulk ion exchange material and sand using a suction tool while being fully submerged in effluent.

System Overview

FIG. 1 depicts an isometric view of an embodiment of a robotic manipulator arm (RMA) 100 when partially extended. The RMA 100 in some embodiments is operable to carry out inspection, maintenance, repairs, and cleaning operations in difficult to access and/or hazardous environments. The RMA 100 in the depicted embodiment comprises a support frame 10, carriage 115, mast 120, forearm 130, elbow 140, wrist 150, and an end effector 160. Some embodiments may comprise additional components, or more than one of one or more of the depicted components. In some embodiments, at least one of the mast and forearm are extendable by means such as telescoping. The degrees of freedom for the depicted embodiment are vertical mast extension/retraction, mast rotation, elbow pivots, forearm extension/retraction, wrist pitch, and wrist roll. In some embodiments, additional tools and carts may be used depending on the application and project requirements.

In some embodiments, the RMA 100 is sized and configured to be transportable. In some embodiments, the RMA 100 is designed to be easily maneuvered through existing rooms and doors, taking into consideration constraints comprising limited head room, access in and out of doorways, existing equipment and infrastructure, and access points. The RMA 100 may be scaled to its intended application. In an embodiment, the RMA 100 has a vertical reach of 32 feet and a horizontal reach of 15 feet when fully extended. Other versions of vertical and horizontal reach are possible depending on how the RMA is scaled to its intended application.

In some embodiments integration of carbon fiber and other lightweight materials minimizes the overall weight of the RMA 100 while retaining a high payload capacity. In some embodiments, the payload capacity of the RMA 100 is up to 100 lbs. at full reach and up to 150 lbs. in specific orientations. The RMA 100 is scalable for differing operations and environments thus a wide range of payload capacities are possible.

Support Frame

FIG. 2 depicts an embodiment of an RMA 100 housed in a support frame 10. In some embodiments, the RMA 100 fits completely within the support frame 10 when it is fully collapsed thus increasing maneuverability of the system during deployment and retrieval and decreasing the storage footprint. In some embodiments, the support frame 10 may comprise wheels or some other such mechanism to facilitate transportation and positioning. In some embodiments when the support frame 10 is positioned, it may be mounted to external supports 105 to increase system stability during deployment of the manipulator arm. In some embodiments, the support frame 10 may provide containment for at least one of operation, wash-down, and transportation.

Carriage

Figure 2A:
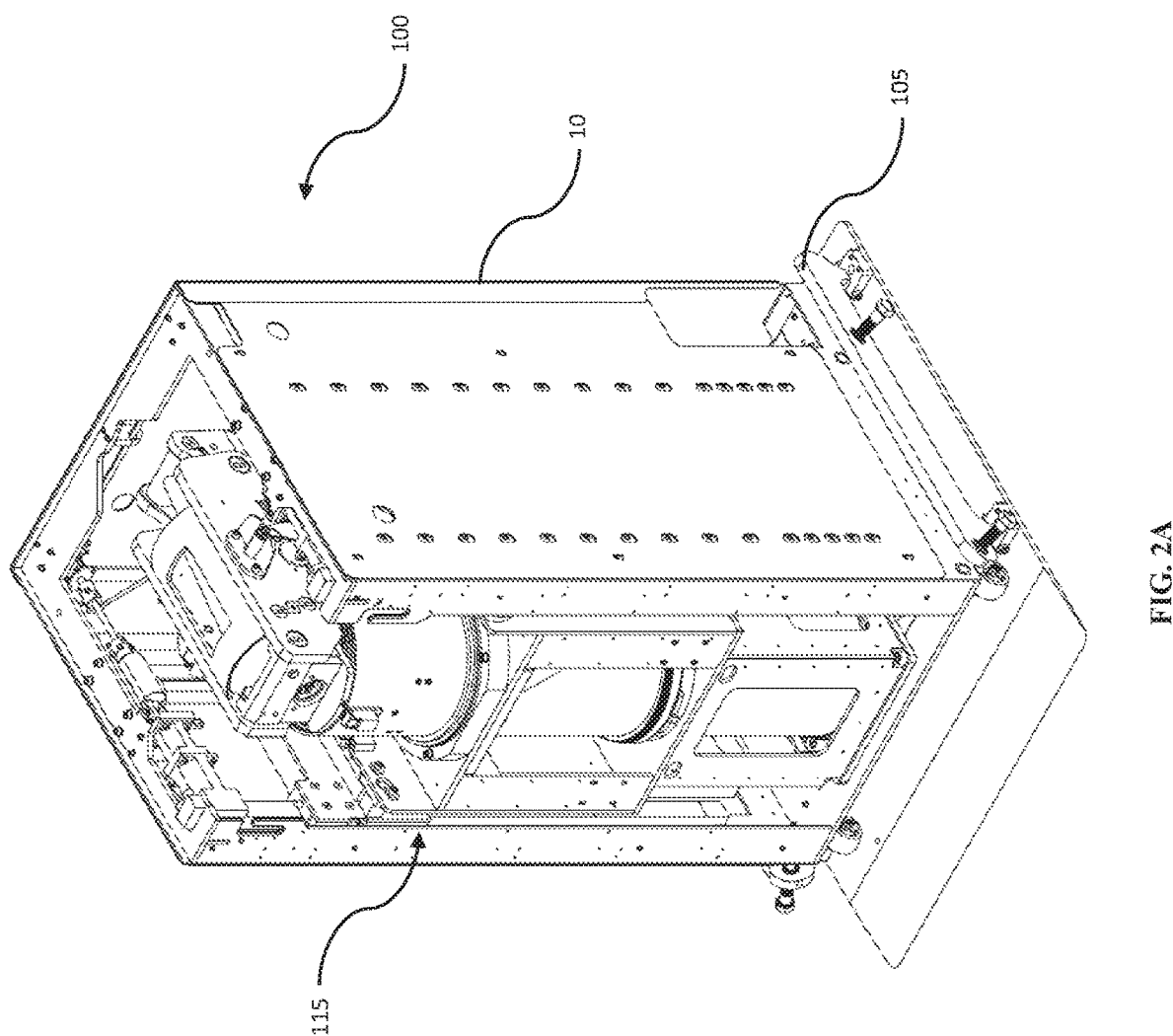
FIG. 2A depicts an isometric view of an embodiment of an un-deployed RMA.

In sonic embodiments, such as the embodiment depicted in FIGS. 2A and 2B, a carriage 115 may be used to couple the RMA 100 to the support frame 10 during operations. The carriage 115 in some embodiments may integrate a cam path 112 and/or a rotary actuator to control the alignment of the RMA 100 as it is deployed. In some embodiments, the rotary actuator is hydraulic. In some embodiments, the carriage 115 may comprise control componentry for operation and control of the RMA 100 such as electric wire rope winches, position feedback, and motors for mast extension and/or rotation. In some embodiments, the carriage 115 further serves the purpose of cable management.

Deployment/Retrieval

FIGS. 3A through 3H depict an embodiment of an RMA 100 deployment process.

Figure 3A:
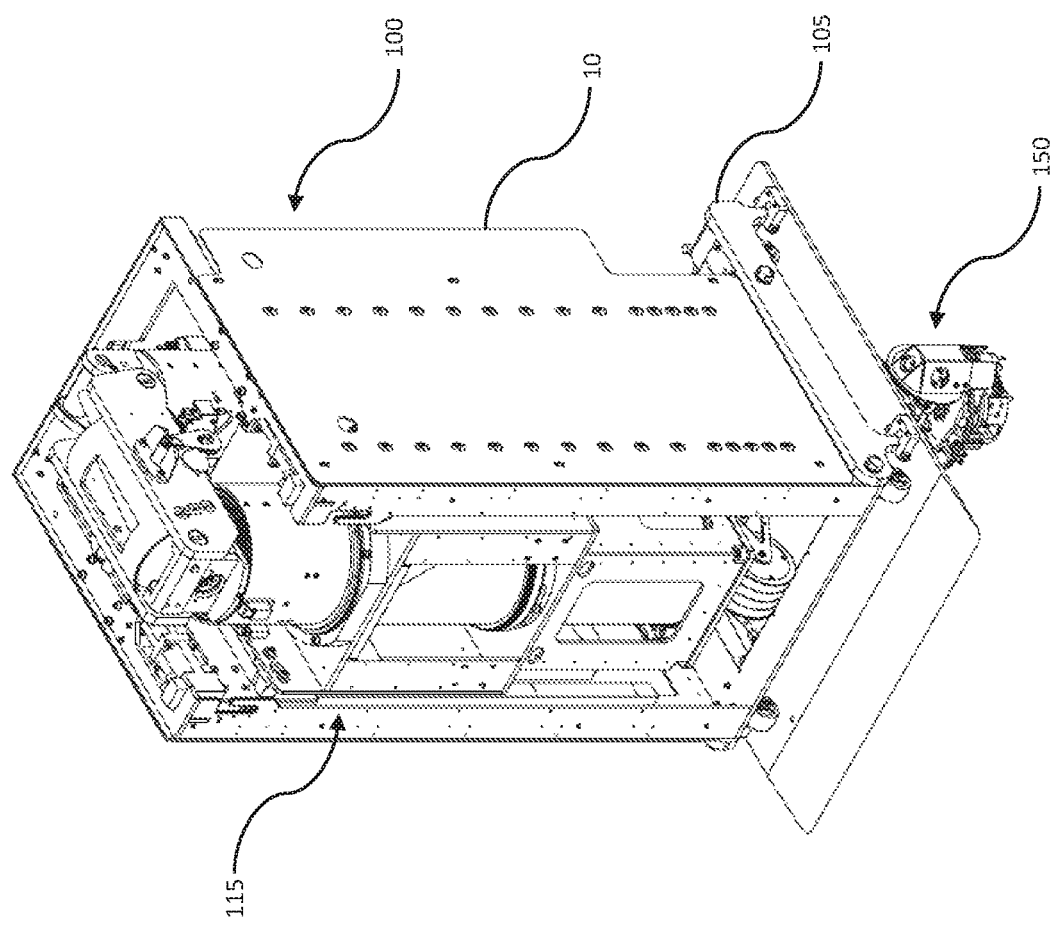
FIG. 3A depicts an isometric view of an embodiment of an RMA at the beginning of a deployment procedure.
Figure 3C:
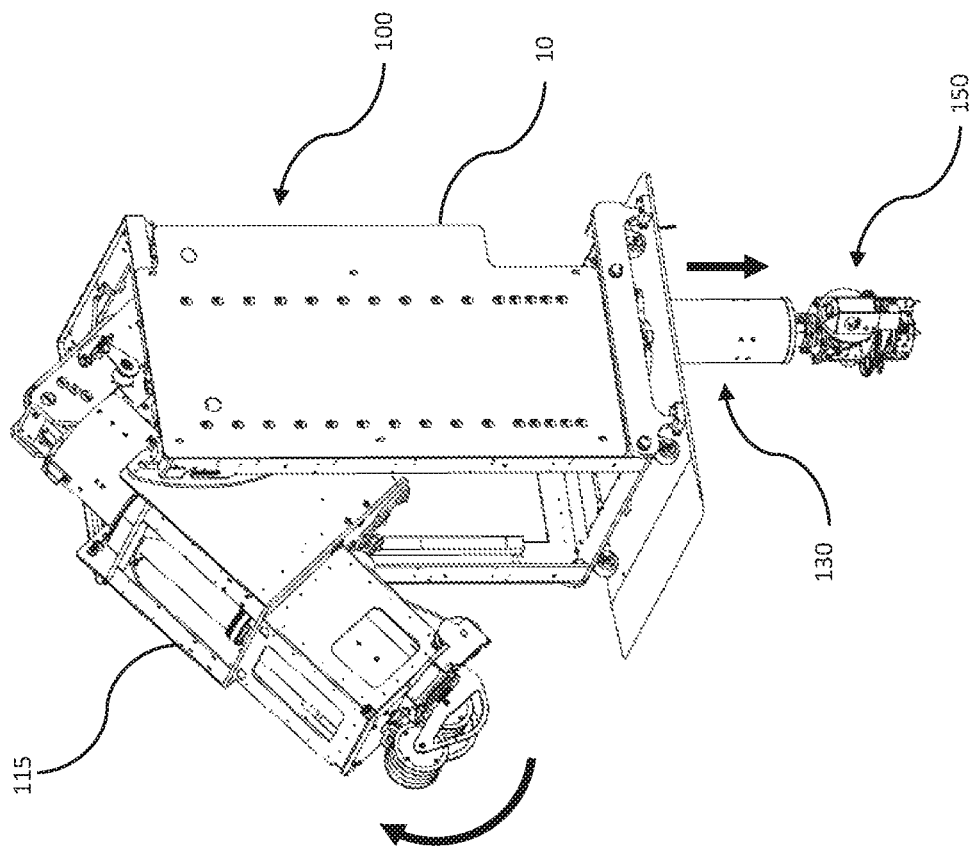
FIG. 3C depicts the embodiment of FIG. 3A as the carriage lifts upwards about 45° and the forearm extends farther into the access point.
Figure 3B:
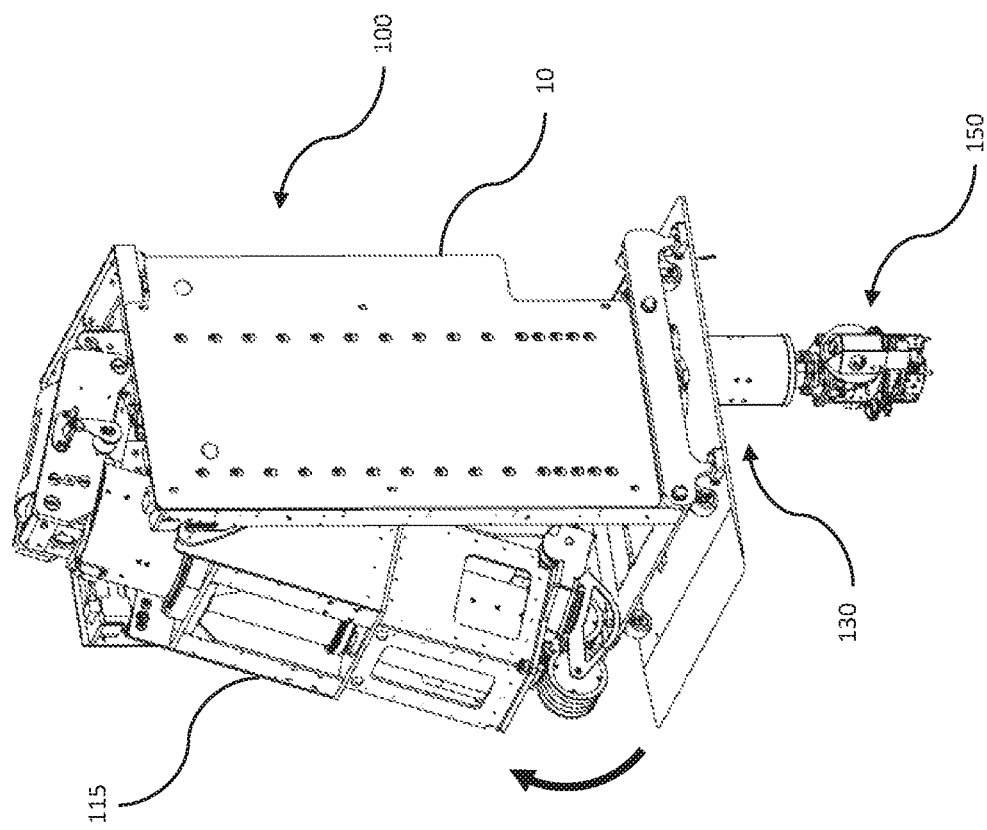
FIG. 3B depicts the embodiment of FIG. 3A as the carriage lifts upwards about 15° and the forearm enters the access point.
Figure 3E:
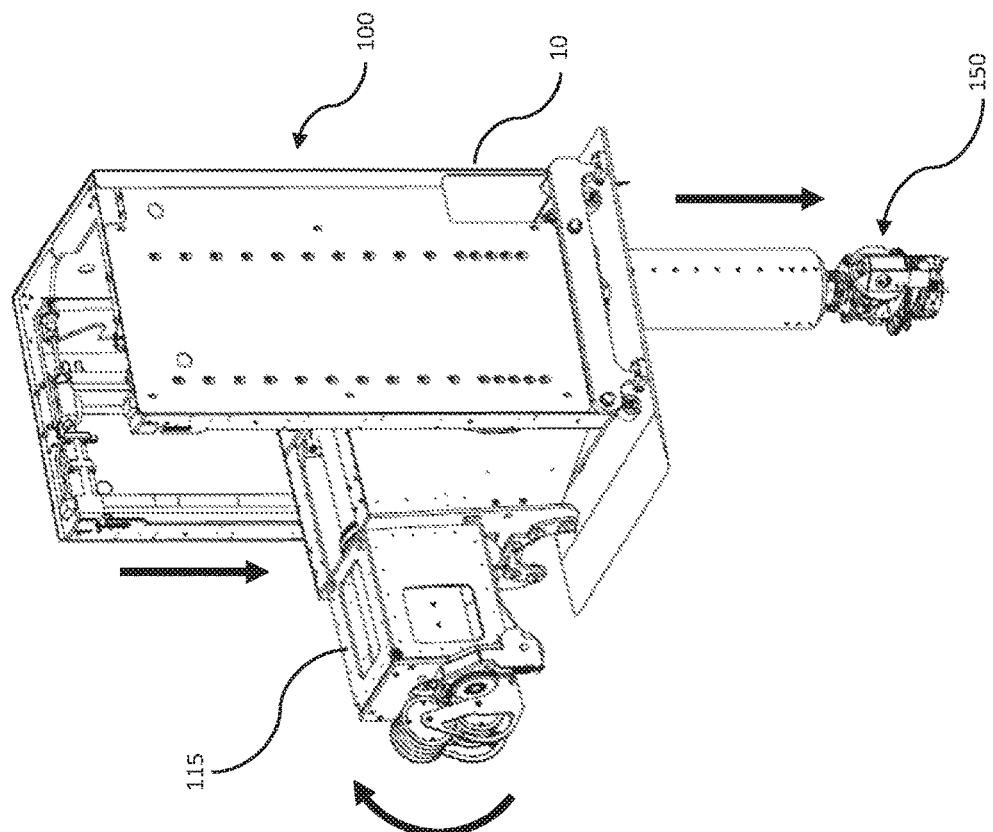
FIG. 3E depicts the embodiment of FIG. 3A as the reaches the base of the frame and reaches 90°.
Figure 3D:
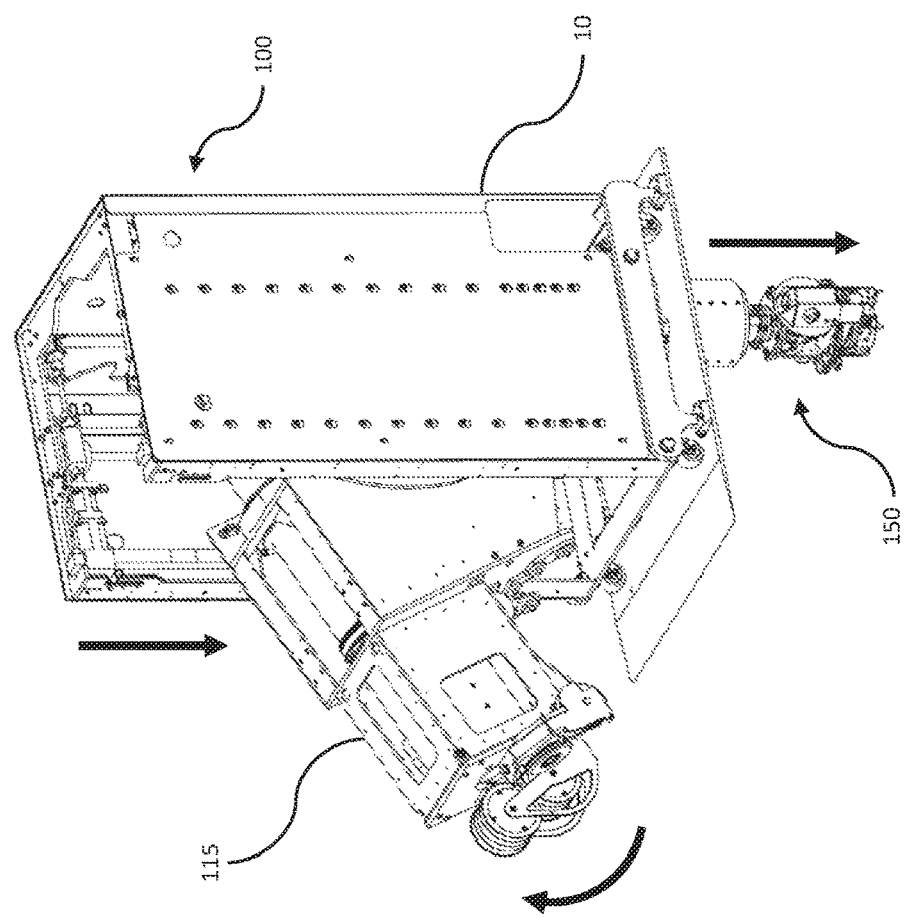
FIG. 3D depicts the embodiment of FIG. 3A as the carriage is lowered to the base of the frame.

FIG. 3A depicts an RMA 100 at the beginning of deployment when the working end of the manipulator arm has been inserted into the access point. In the depicted embodiment, the access point is below the RMA 100. It should be clear that in some embodiments the RMA 100 may be configured to deploy through access points that are in walls, ceilings, or other structures. In some embodiments, the RMA 100 may be deployed in open environments.

FIGS. 3B through 3E depict the RMA 100 as the forearm 130 is entering the access point. In some embodiments, a cam and cam path may be used to control the angle(s) at which the RMA 100 is deployed into the access point. In the depicted embodiment, a cam and cam path are used to keep the manipulator vertical as it enters the access point below it. In the depicted embodiment, the carriage 115 is rotated up using a cam mechanism as the forearm 130 is deployed into the access point. In the depicted embodiment, the mast is first rotated upward to 90° (FIGS. 3B and 3C) then lowered (FIGS. 3D and 3E) to the bottom of the frame 10.

Figure 3G:
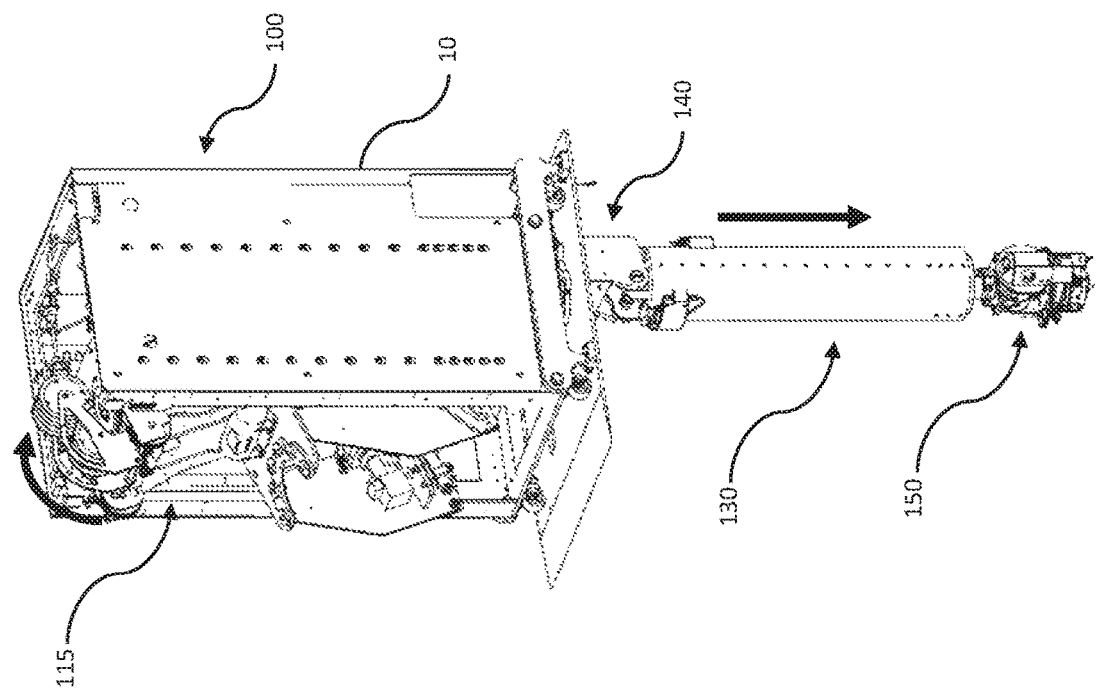
FIG. 3G depicts the embodiment of FIG. 3A as the carriage nears 180° in relation to its original position and the elbow has entered the access point.
Figure 3F:
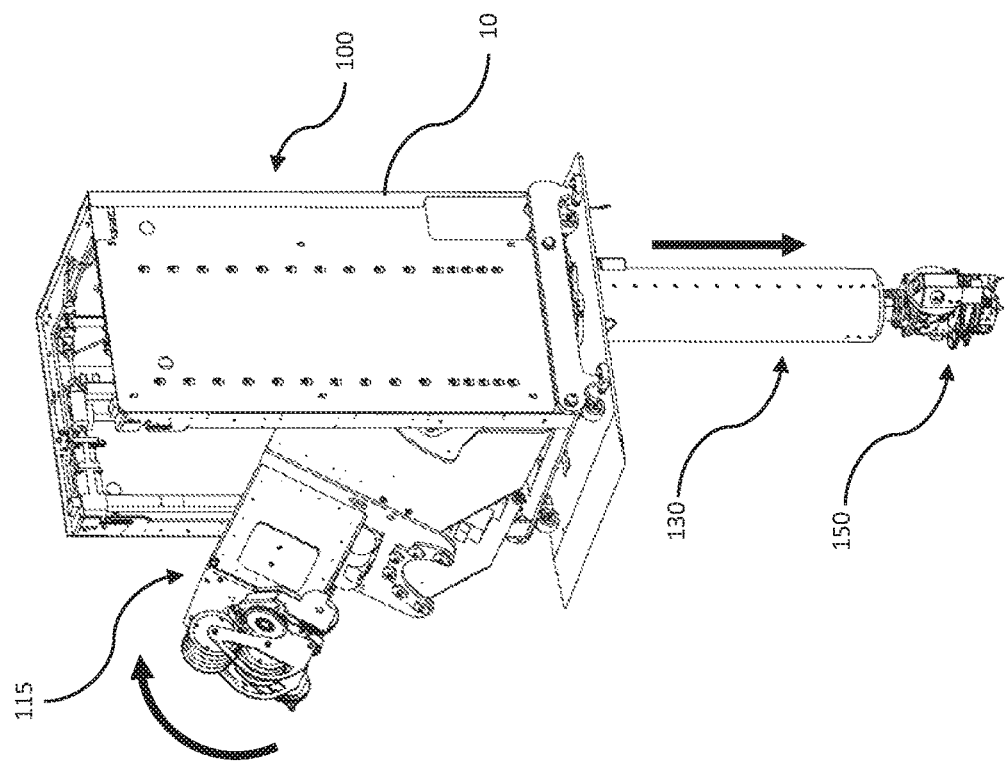
FIG. 3F depicts the embodiment of FIG. 3A as the carriage lifts upwards about 120°.
Figure 4B:
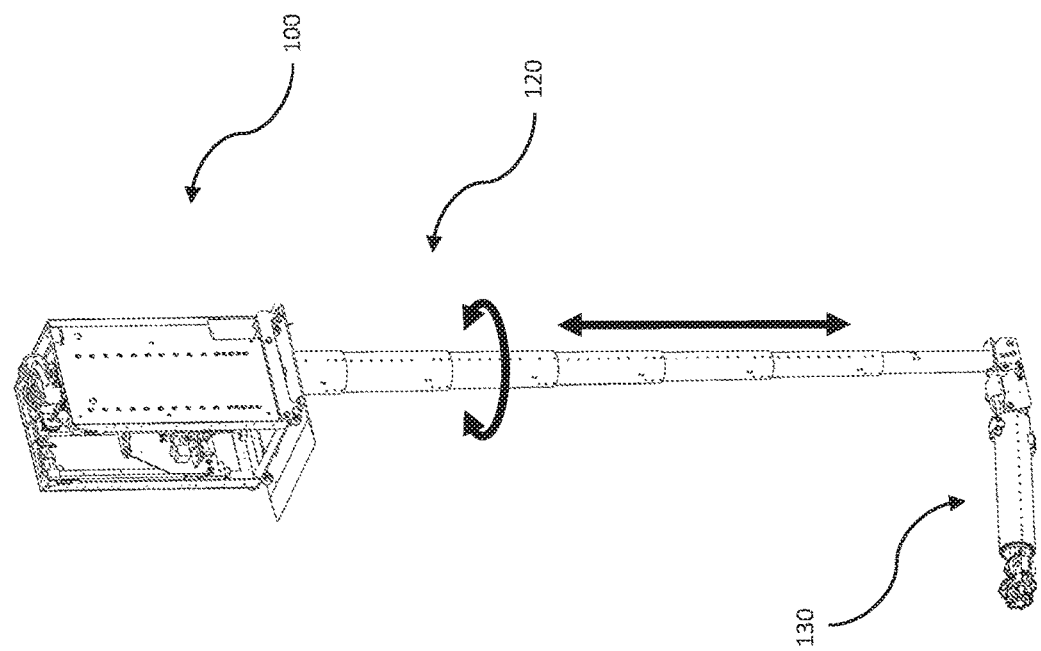
FIG. 4B depicts the embodiment of FIG. 4A with the mast extended.
Figure 4A:
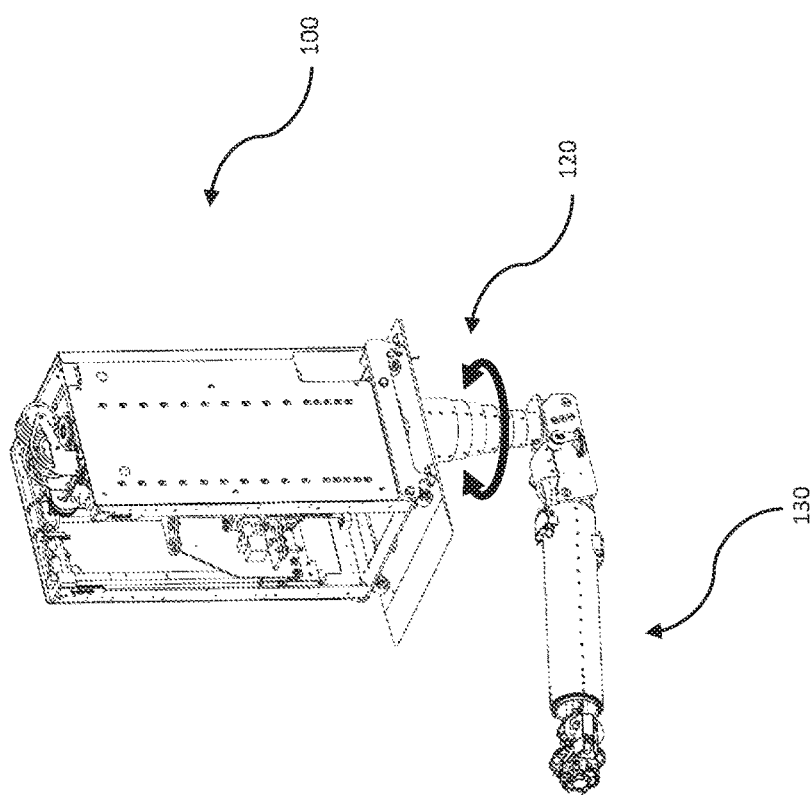
FIG. 4A depicts an embodiment of an RMA with the mast retracted.

FIGS. 3F and 3G depict the RMA 100 as an elbow 140 is entering the access point and the carriage 115 is rotated upward another 90°. In the depicted embodiment, the carriage 115 rotates 180° during the deployment process. Once the carriage 115 is 180° from its original position the mast may be deployed through the access point as depicted in FIGS. 4A and 4B.

The RMA 100 in some embodiments utilizes a cart to facilitate transportation and/or installation. A cart may allow the RMA 100 to be laid down on its side (horizontally) and may optionally include a bar linkage or other such mechanism to aid in moving the RMA 100 from a horizontal to a vertical orientation and vice versa. Once in position, the optional bar linkage may be actuated to power one or more onboard hydraulic cylinders. When the frame is in the upright (vertical) position and located over the workspace, the cart may be removed.

In some embodiments, the RMA 100 frame incorporates a number of wheels, and/or one or more other mobility facilitating mechanisms, to allow the RMA 100 to be transported and positioned. The RMA 100 may be manually positioned or positioned using remote control. In some embodiments, the installation cart may comprise one or more drive mechanisms to allow for remote operation of the cart for proper positioning.

In some embodiments, the RMA 100 may be mounted to pre-existing infrastructure, or other supports, to increase stability during deployment of the manipulator. In some embodiments, the RMA 100 comprises a mounting plate which may be secured to existing infrastructure. For example, the mounting plate may be secured to the floor for a floor access point such that the load path is directed through the mounting plate to the floor rather than through the frame.

For deployment, the manipulator in some embodiments may use an overhead A-frame gantry beam and chain falls or other lifting mechanism. The RMA 100 may be unfolded into an access point either while powered or unpowered. Some embodiments comprise a cam and cam path for controlling motion of deployment for difficult access points. In some embodiments, during deployment, the RMA 100 carriage may follow a specific cam path allowing the manipulator to travel linearly into an access point.

Mast

FIG. 4A depicts an embodiment of the mast 120 in a retracted position. In some embodiments, the mast 120 may comprise one or more telescoping tubes. The mast 120 in some embodiments may be extended or retracted depending on the desired depth/height as shown in FIG. 4B. In some embodiments one or more tubes are formed from light material such as carbon fiber. In some embodiments one or more tubes are composed of metal such as stainless steel. To allow for mast 120 rotation the outermost tube may be coupled to a gear or slewing ring that may be driven by a motor, in some embodiments. The mast 120 may be securely mounted to the carriage 115 by means of mounting rings and bearings coupled to the outermost tube. In some embodiments, the mast 120 is capable of rotating 360°. In some embodiments, the innermost tube may comprise a hydraulic cylinder which may form or couple to an elbow mechanism. In the depicted embodiment, the hydraulic cylinder is double-acting.

Elbow

Figure 5:
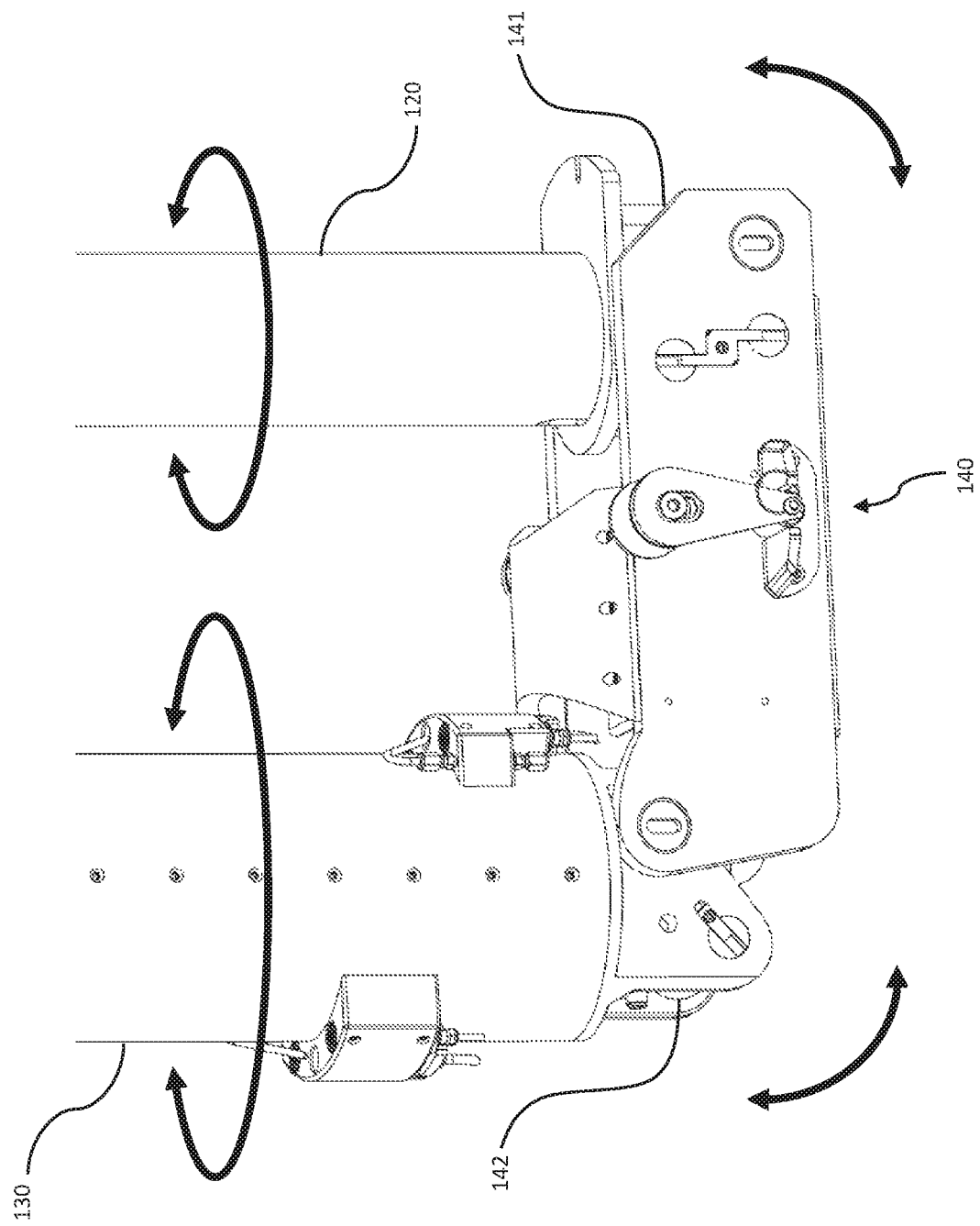
FIG. 5 depicts an embodiment of an elbow.

FIG. 5 depicts an embodiment of the elbow 140 which may be used to couple a mast 120 to a forearm 130. In some embodiments, the elbow 140 is a two-stage actuation. In some embodiments, the elbow 140 allows for a total of −10° to +180° of motion from vertically down. In some embodiments, the mast-elbow pivot 141 of the elbow allows for 90° of motion to allow the elbow linkage to be oriented down or horizontal. In some embodiments, the forearm-elbow pivot 142 allows for 100° of motion, for instance −10° to +90° of actuation.

Figures 6A, 6B, 6C:
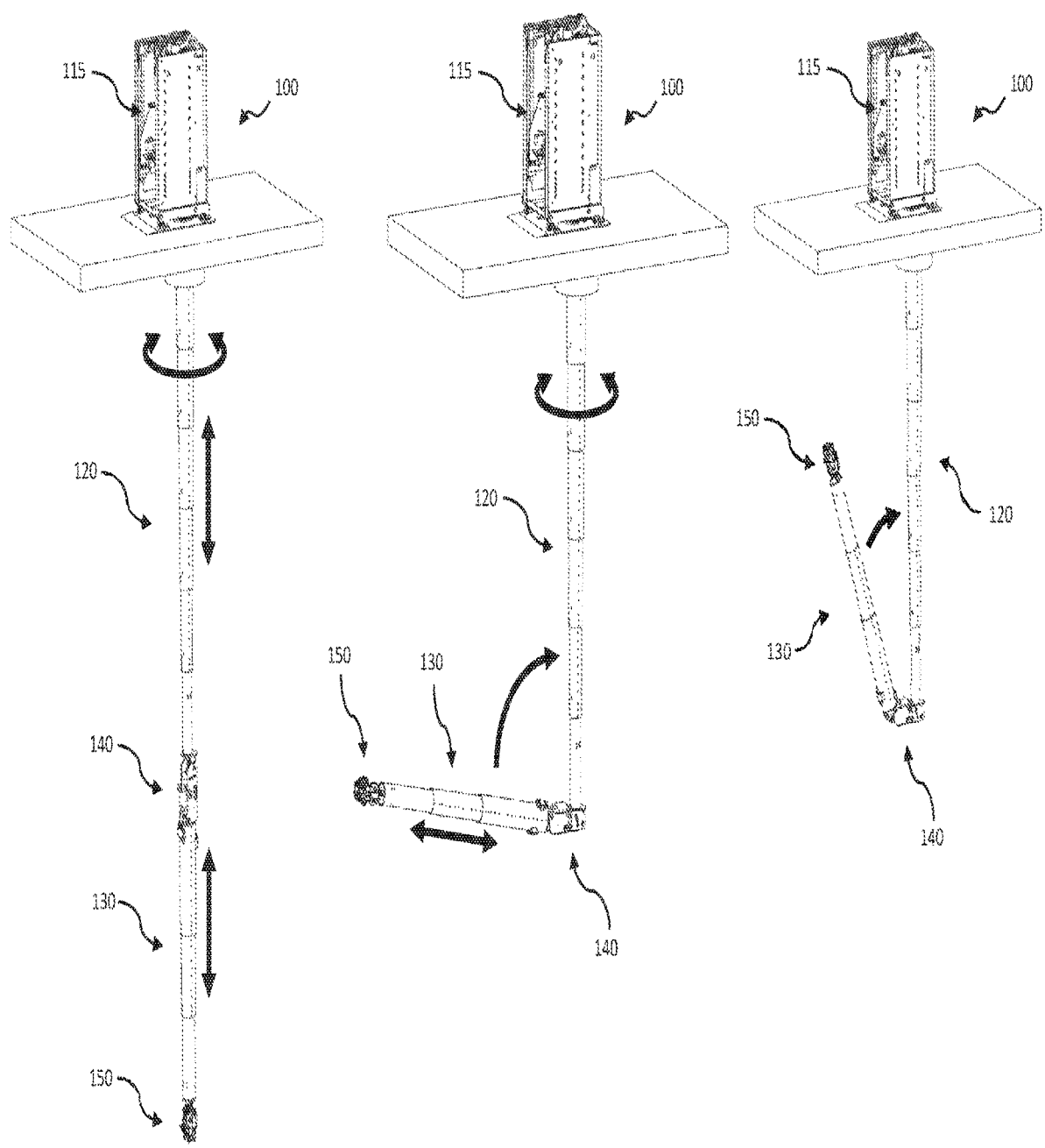
FIG. 6A depicts an isometric view of an embodiment of an RMA elbow is oriented vertically downwards and the mast and forearm are both fully extended.
FIG. 6B depicts an isometric view of the embodiment of FIG. 6A with a 90-degree actuation of the mast-elbow pivot lifting the forearm to a horizontal position.
FIG. 6C depicts an isometric view of the embodiment of FIG. 6A with a 90-degree actuation of the forearm-elbow pivot lifting the forearm towards a vertical upward position.

FIG. 6A depicts an embodiment of the elbow 140 oriented directly downwards. FIG. 6B shows a 90° actuation of the mast-elbow pivot 141 lifting the forearm 130 to a horizontal position. FIG. 6C shows an example 90° actuation of the forearm-elbow pivot 142 that lifts the forearm 130 to a vertical position. The combination of these actuations may allow the RMA 100 to reach the full extents of the workspace. In some embodiments, each stage is actuated using a single hydraulic cylinder, and each pivot pin incorporates a resolver for position feedback. In some embodiments, stage actuation may require multiple hydraulic cylinders.

In some embodiments, a double-acting hydraulic cylinder is mounted within the inner-mast 120 and provides pivot motion for a first elbow joint 141. The hydraulic cylinder assembly may comprise a stainless-steel rod and cylinder weldment. In some embodiments, the hydraulic cylinder may attach to the end of the mast 120 by means of a pin.

The RMA 100 may comprise one or more joints. In some embodiments, all the joints actuate in the same plane. The joints in some embodiments may be offset to actuate in different planes or at different angles with respect to each other. Different joint types with different ranges of motion may be implemented, such as ball joints and chain joints. Chain joints are described in co-pending patent application entitled Systems and Methods for Chain Joint Cable Routing, Ser. No. 14/975,544 filed Dec. 18, 2015, with a priority date of Dec. 19, 2014, which is hereby incorporated by reference in its entirety. In some embodiments one or more of the joints may be hydraulically actuated.

Forearm

Figure 7A:
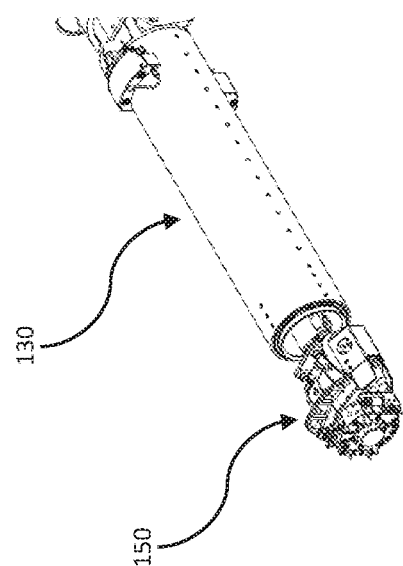
FIG. 7A depicts an embodiment of an extendable RMA forearm when it is retracted.
Figure 7B:
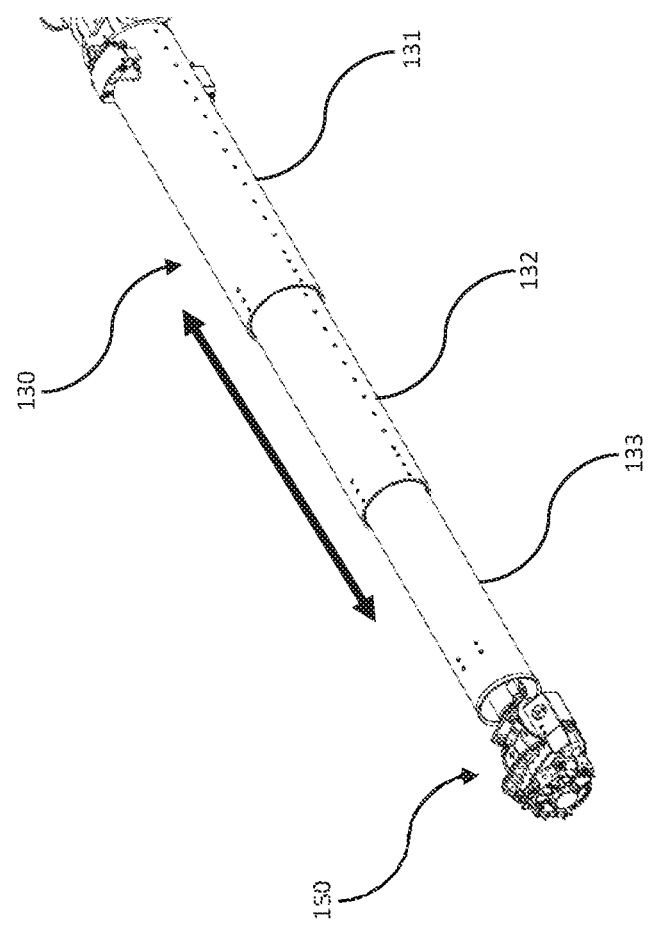
FIG. 7B depicts the embodiment of FIG. 7A when the forearm is extended.

In some embodiments, the forearm 130 is similar in design to the mast. In some embodiments, the forearm 130 comprises one or more telescoping tubes. In some embodiments, the one or more tubes may be composed of carbon fiber. In some embodiments one or more tubes is composed of metal such as stainless steel. FIG. 7A depicts the forearm 130 in a retracted position and FIG. 7B depicts the forearm 130 in an extended position. The telescoping forearm 130 may extend and retract using one or more hydraulic cylinders which may be ported together to allow them to actuate at the same time, in some embodiments. The cylinder rods may be hollow to minimize the number of hydraulic lines required to run through the forearm 130. In some embodiments, the forearm pivot actuation is provided by one or more elbows.

In some telescoping embodiments, bushings may be utilized to prevent rotation of the mast and/or forearm tubes with respect to each other. In some embodiments, the tubes may be equipped with dual keys and matching key slots in the bushings to keep the sections from rotating independently. In some embodiments, the bushings may have slots machined into them to allow wash-down water to flow through. Hard stops may be incorporated into one or more of the tubes to prevent over-extension or over-retraction. In some embodiments, retraction hard stops screw into the top of each keyway. In some embodiments, one or more interfaces between telescoping tools and other componentry may be coated or comprised of low friction material to facilitate motion.

In some embodiments, the telescoping mast and/or forearm may extend using gravity. In some embodiments, the mast and/or forearm may be retracted using a rope, tether, or other flexible attachment which may be connected to a winch or hoist mechanism. In some embodiments, the retraction may be effected using one or more electrically driven wire rope hoists. The mast and/or forearm in some embodiments include one or more redundant wire rope hoists for failure recovery. Each hoist may be capable of retraction on its own in the case another fails. Wire rope hoists may position the mast and/or forearm, along its stroke, as desired by the operator.

Wrist

Figure 8C:
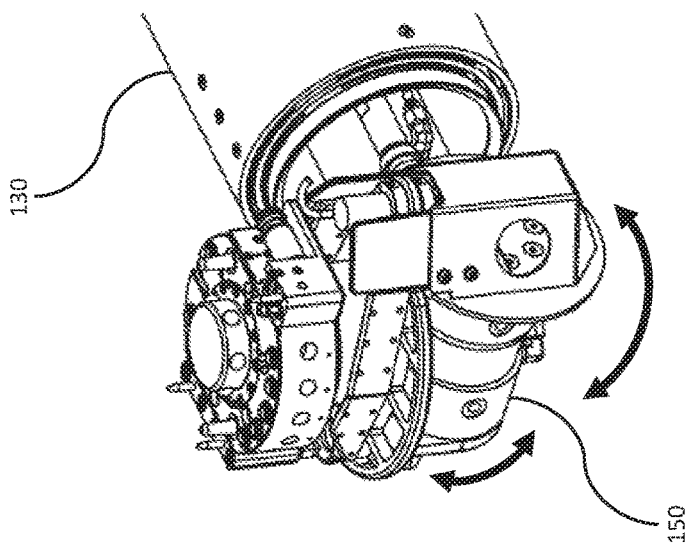
FIG. 8C depicts the wrist joint embodiment of FIG. 8A at +90°.
Figure 8B:
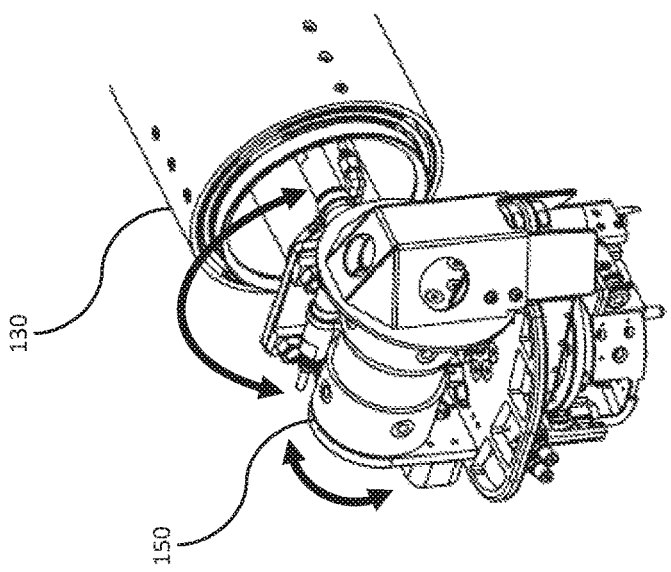
FIG. 8B depicts the wrist joint embodiment of FIG. 8A at −90°.
Figure 8A:
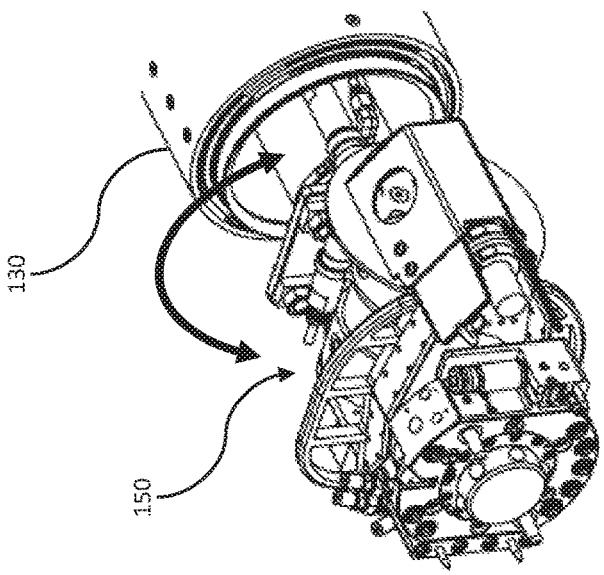
FIG. 8A depicts an isometric view of an embodiment of a wrist joint at 0°.

In some embodiments, the RMA 100 comprises a wrist joint 150 at the working end of the forearm 130. FIG. 8A through 8C depict an example range of motion of the wrist 150. The wrist 150 in some embodiments may be capable of one or more actuations including a wrist pitch and a wrist roll. In some embodiments, the wrist 150 may comprise one or more rotary actuators that enable wrist roll and pitch. The wrist pitch may be actuated using a hydraulic rotary actuator for +90° of motion in the vertical plane, in some embodiments. The wrist roll may utilize a hydraulic rotary actuator and is capable of 180° of rotation, in some embodiments. In some embodiments, each joint in the wrist 150 is capable of up to 180° of rotation. In some embodiments, the wrist 150 comprises a master tool changer assembly. In some embodiments, the wrist 150 may comprise a universal grip or other mechanism to allow for deployment of a variety of tools and/or end effectors.

End Effectors

Figure 9A:
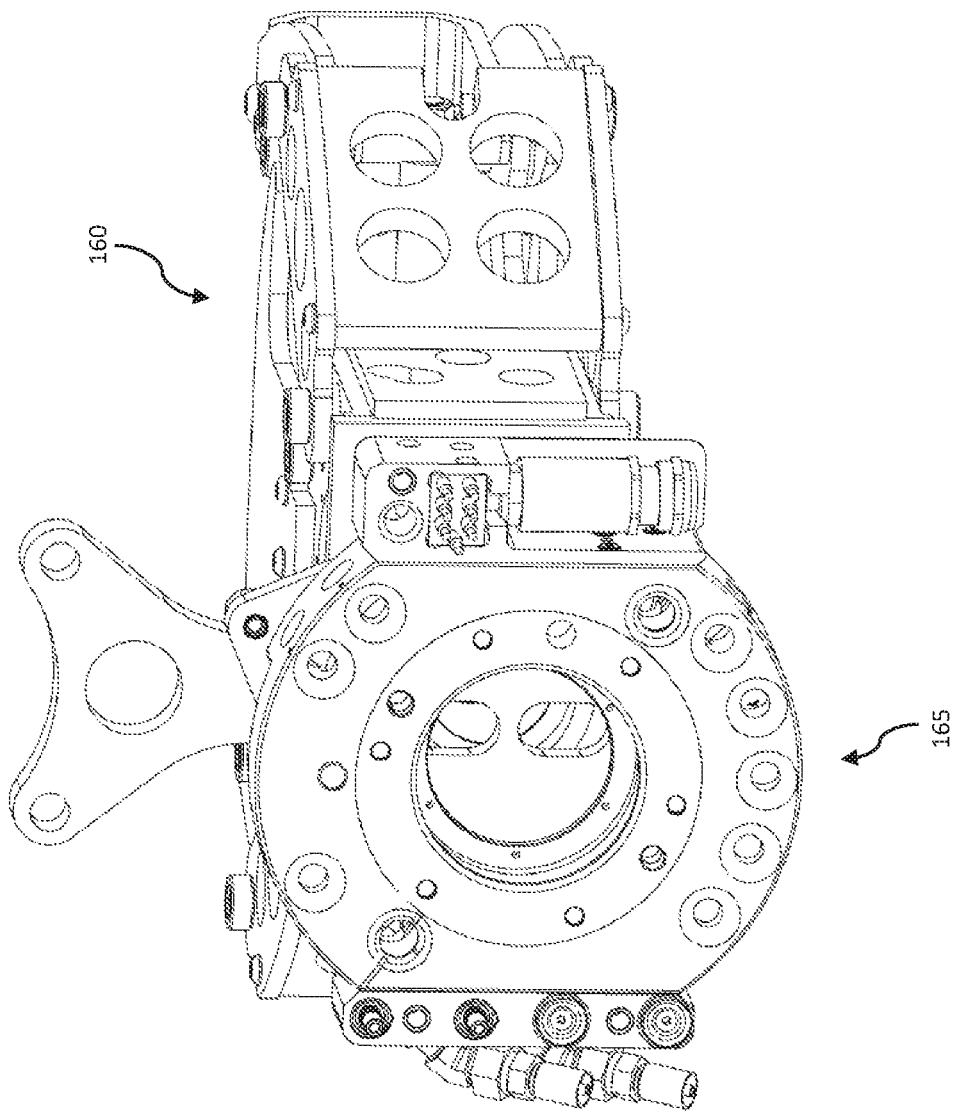
FIG. 9A depicts an embodiment of an end effector coupling mechanism for coupling an end effector to a forearm.
Figure 9B:
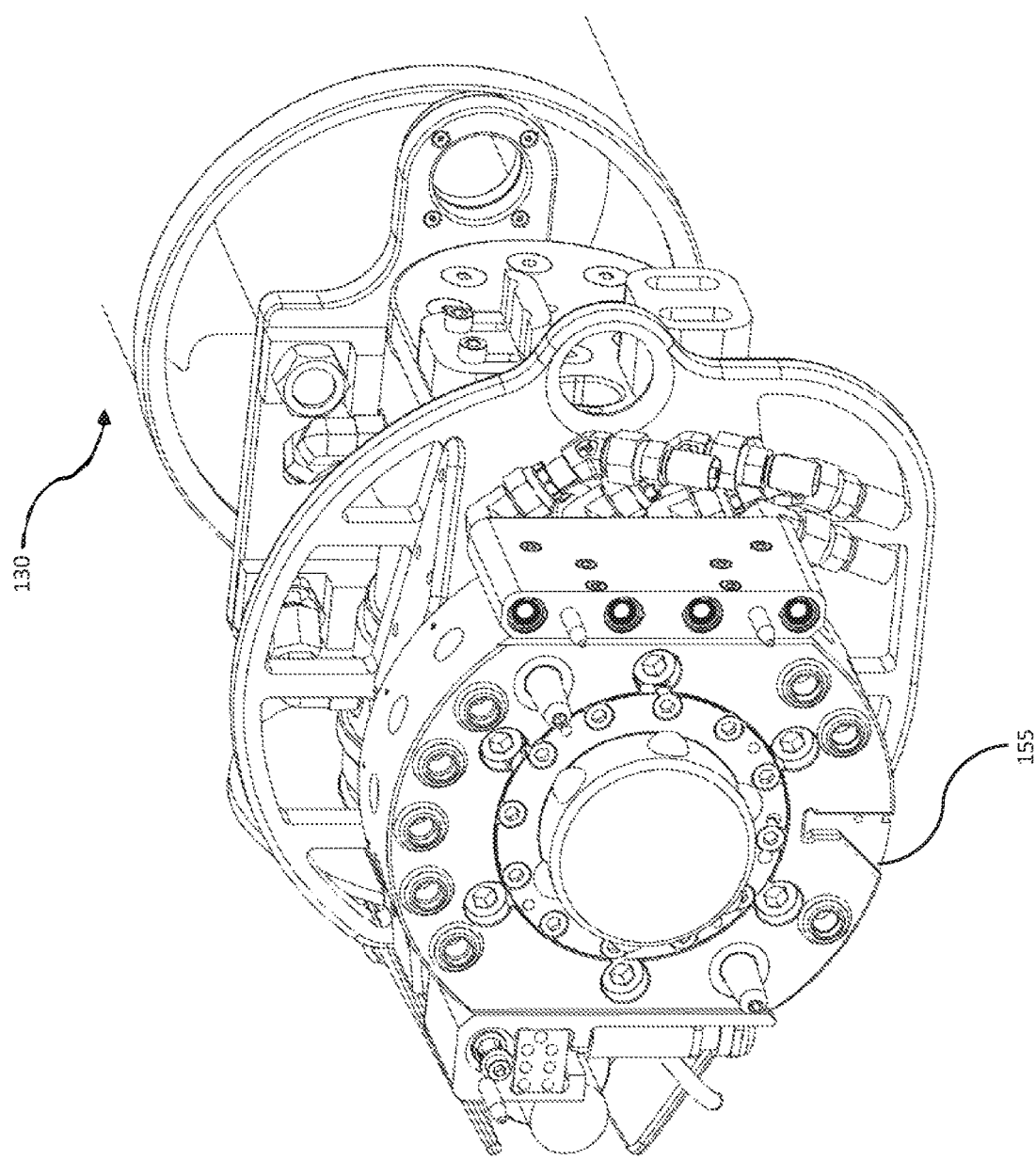
FIG. 9B depicts an embodiment of a wrist coupling mechanism on an embodiment of a forearm corresponding to the end effector coupling mechanism embodiment of FIG. 9A.

In some embodiments, to accommodate multiple end effectors in different orientations, there is a matching interface between the end effector, forearm, or wrist and tools or other end effectors. Some embodiments may incorporate a universal coupling mechanism between various tools and/or end effectors and the working end of the RMA. In some embodiments, the coupling mechanism may be configured for end effector interchange. FIG. 9A depicts a rear isometric view of an embodiment of a gripper 160 comprising an embodiment of an end effector coupling mechanism 165 that can be used to connect and secure an end effector to a forearm 130. FIG. 9B depicts a front isometric view of the forearm 130 comprising an embodiment of a forearm coupling mechanism 155 that couples and secures an end effector 160 to the forearm 130. In some embodiments, the coupling mechanism is adapted for quick attach and release to allow for rapid end effector switching. In some embodiments, the coupling mechanism may comprise one or more of mechanical, electrical, and hydraulic connections. In some embodiments, the coupling mechanism may comprise means for materials transfer into and out of the workspace such as tubing. In some embodiments, the coupling mechanism is adapted to provide power, control, and materials transfer capabilities for a variety of different end effectors.

Figure 9D:
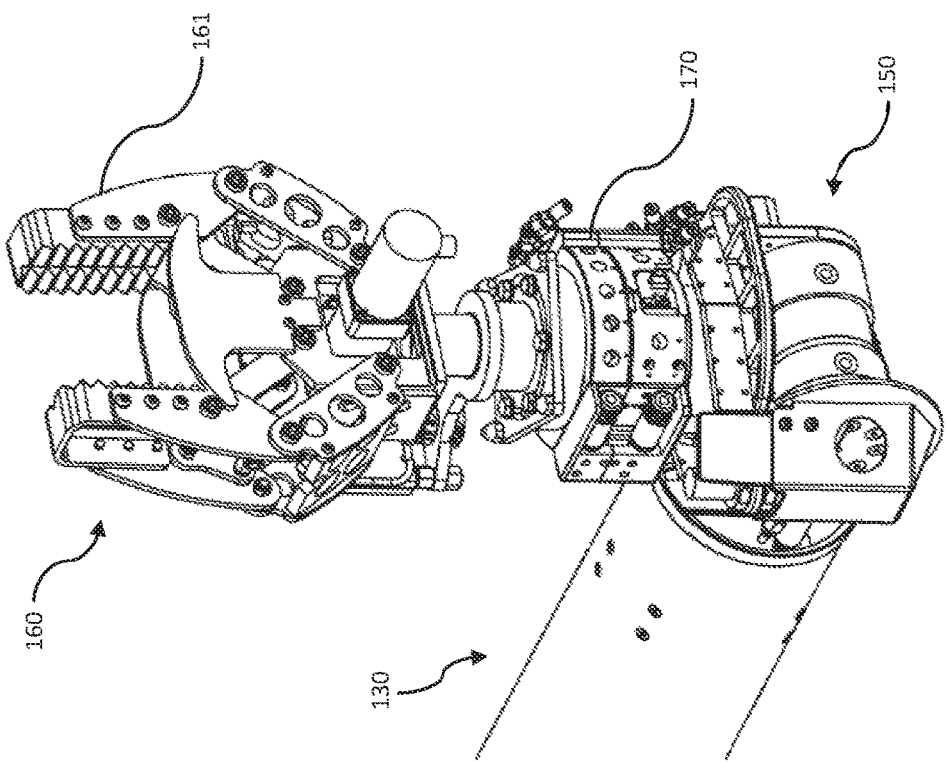
FIG. 9D depicts the coupling mechanism embodiments of FIGS. 9A and 9B when coupled and the wrist is bent 90° upward.
Figure 9C:
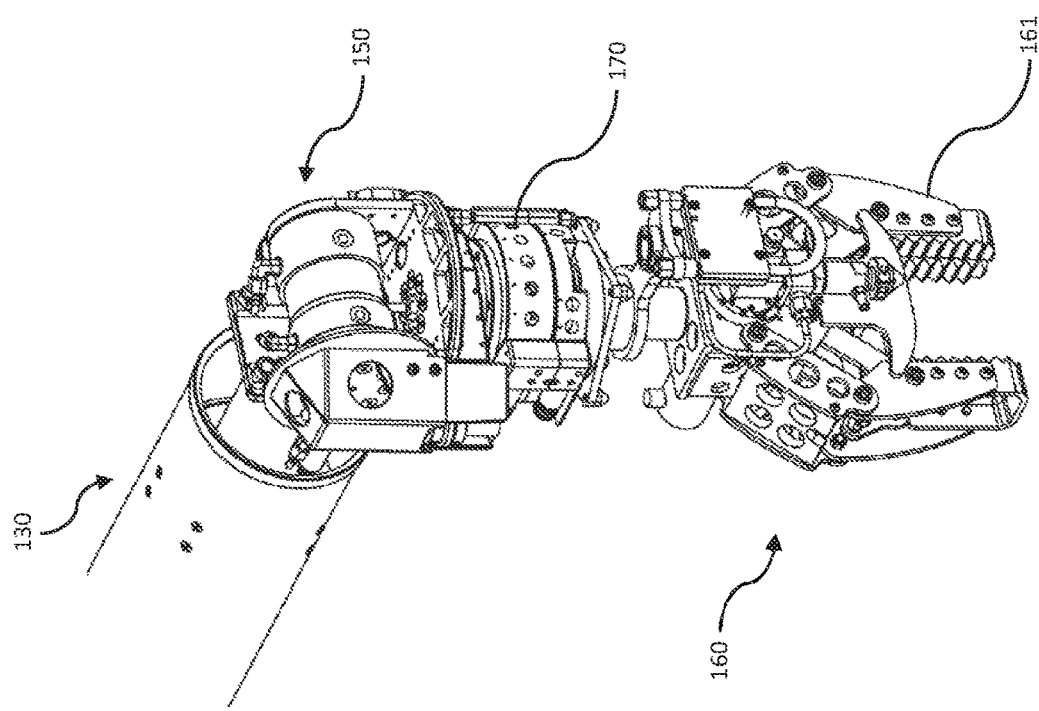
FIG. 9C depicts the coupling mechanism embodiments of FIGS. 9A and 9B when coupled and the wrist is bent 90° downward.
Figure 10B:
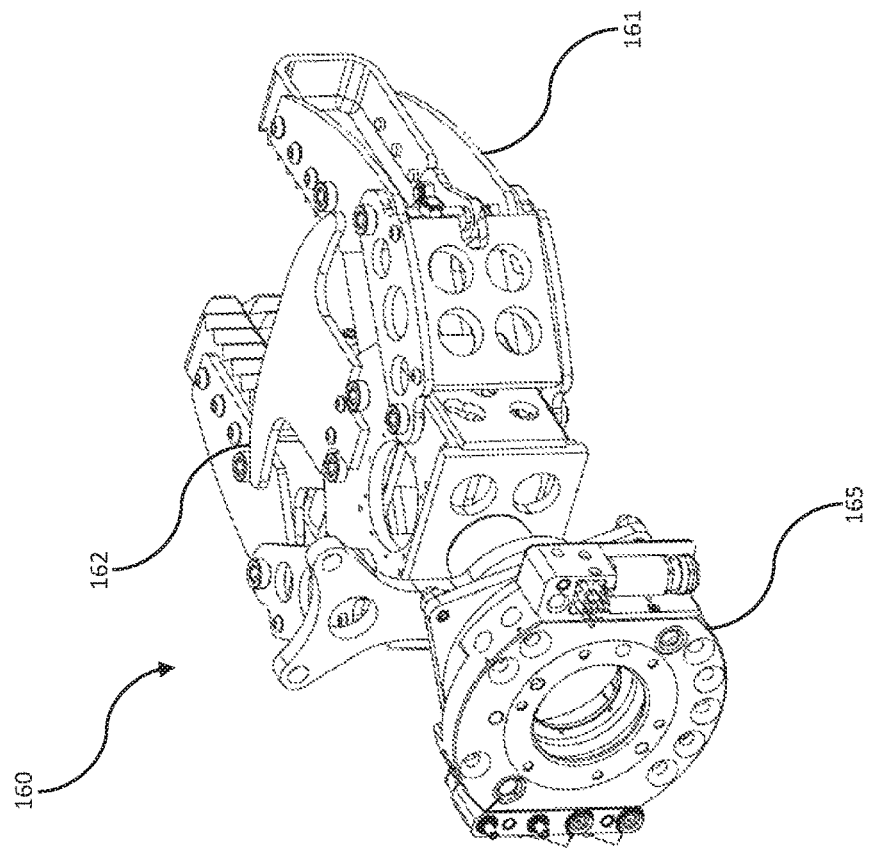
FIG. 10B depicts a rear view of the embodiment of FIG. 10A.
Figure 10A:
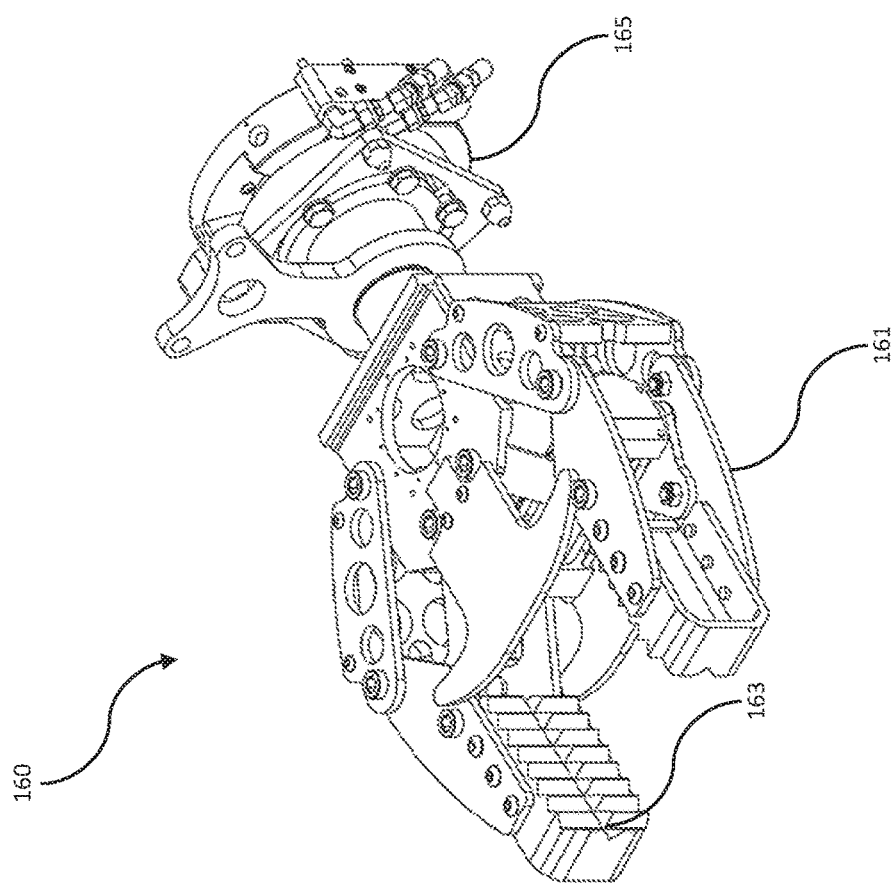
FIG. 10A depicts an isometric view of an embodiment of a gripper end effector.

FIG. 9C depicts the coupling mechanism embodiments of FIGS. 10A and 10B when coupled and the wrist is bent 90° downward. FIG. 9D depicts the coupling mechanism embodiments of FIGS. 10A and 10B when coupled and the wrist is bent 90° upward.

The working end of the forearm 130 may be equipped with one or more sensors and/or an end effector such as a gripper or tool in some embodiments. FIGS. 10A and 10B depict front and rear isometric views of an embodiment of a gripper 160. The gripper 160 may be capable of grasping objects and deploying a variety of tools. In some embodiments, the jaws 161 may be coupled to a linkage 162 to ensure they remain parallel during opening and closing. In some embodiments, in the event of a hydraulic failure, the gripper 160 may fail in its "as-is" position. If pressure is lost the jaws 161 may become compliant and able to move if a predefined load is applied to the jaws 161. In some embodiments, a reduced stroke piston is used for smaller access points keeping the gripper 160 from opening to a size greater than a predetermined limit.

A gripper 160 can employ a wide variety of tools that may be used in different applications. In some embodiments, a gripper 160 may be used in conjunction with another tool, end effector, and/or one or more sensors. This may be useful in instances where the gripper 160 may be used to grasp infrastructure and provide stability to the tool or other end effector. Some embodiments may comprise other tool/end effector/sensor configurations as needed for the desired operations.

For some applications, the end effector may be a specific tool. In some embodiments end effectors are actuated by one or more of mechanical, electro-mechanical, hydraulic, electric over hydraulic, pneumatic, magnetic, piezoelectric, and linear motor actuator.

In some embodiments, each tool or end effector comprises a mounting interface that allows it to be grasped by a gripper 160 in one or more different orientations. One such interface is shown and described in co-pending application System and Method for Inspection and Maintenance of Hazardous Spaces, Ser. No. 15/341,985 filed Nov. 2, 2016, with a priority date of Nov. 3, 2015, which is hereby incorporated by reference in its entirety.

Tools

The RMA 100 can perform a multitude of different operations by deploying a variety of different tools and end effectors. The tools deployed by the RMA 100 may comprise off-the-shelf tools that may be modified for remote deployment, in some embodiments. The RMA 100 may comprise any one or more of waterjet tool, inflatable bag tool, grout tool, shear tool, educator bulk retrieval tool, jet wash tool, scoop/scraper tool, swabbing tool, gamma monitor, and other tools, end effectors, and sensors for carrying out one or more of inspection, maintenance, repairs, and cleaning. A number of other tools are possible including simple tools such as rake, trowel, shovel, and the like.

Figure 11A:
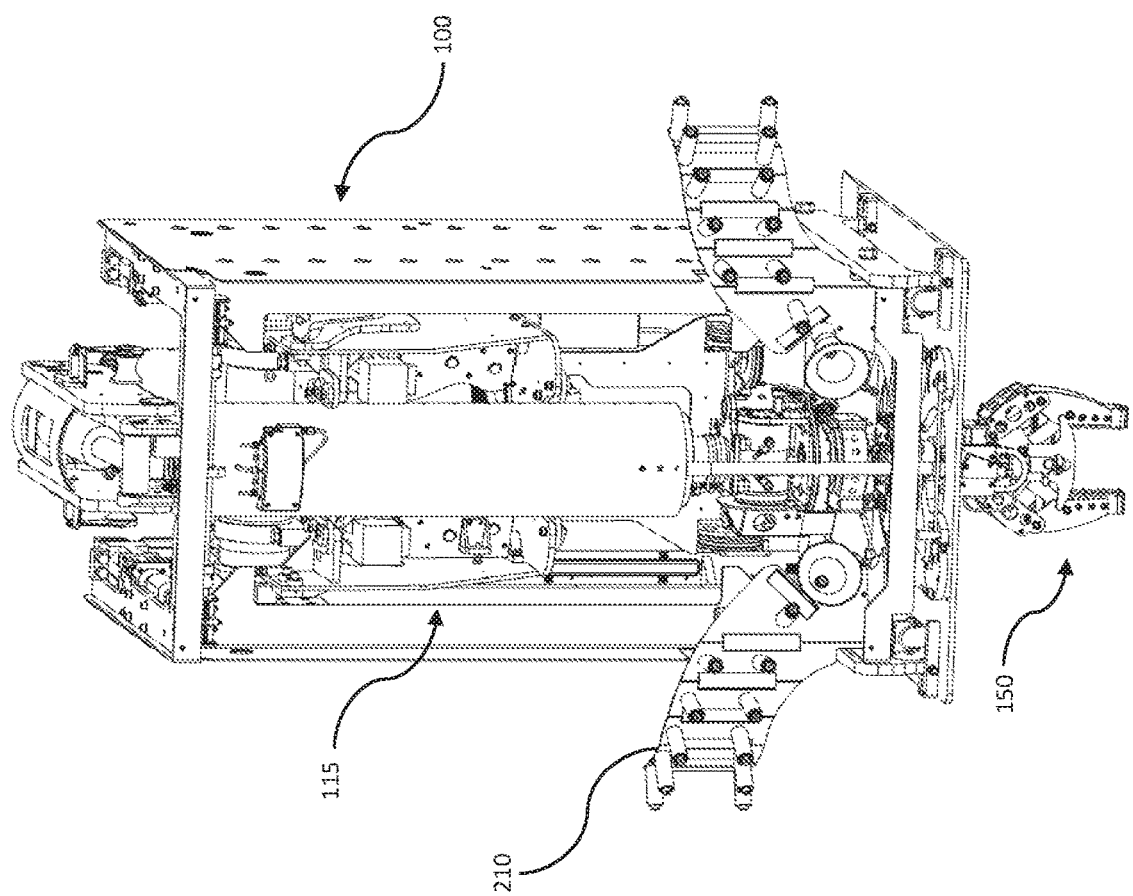
FIG. 11A depicts an isometric view of the RMA end effector change.
Figure 11C:
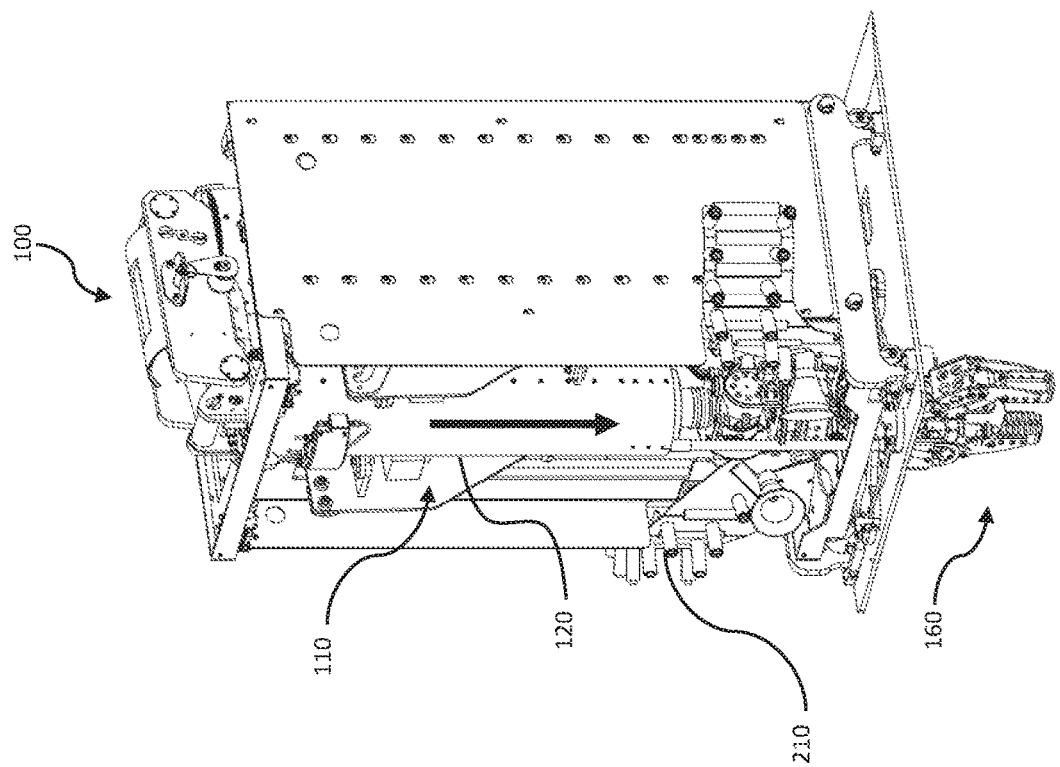
FIG. 11C depicts the forearm of the RMA extending to connect to an end effector embodiment.
Figure 11B:
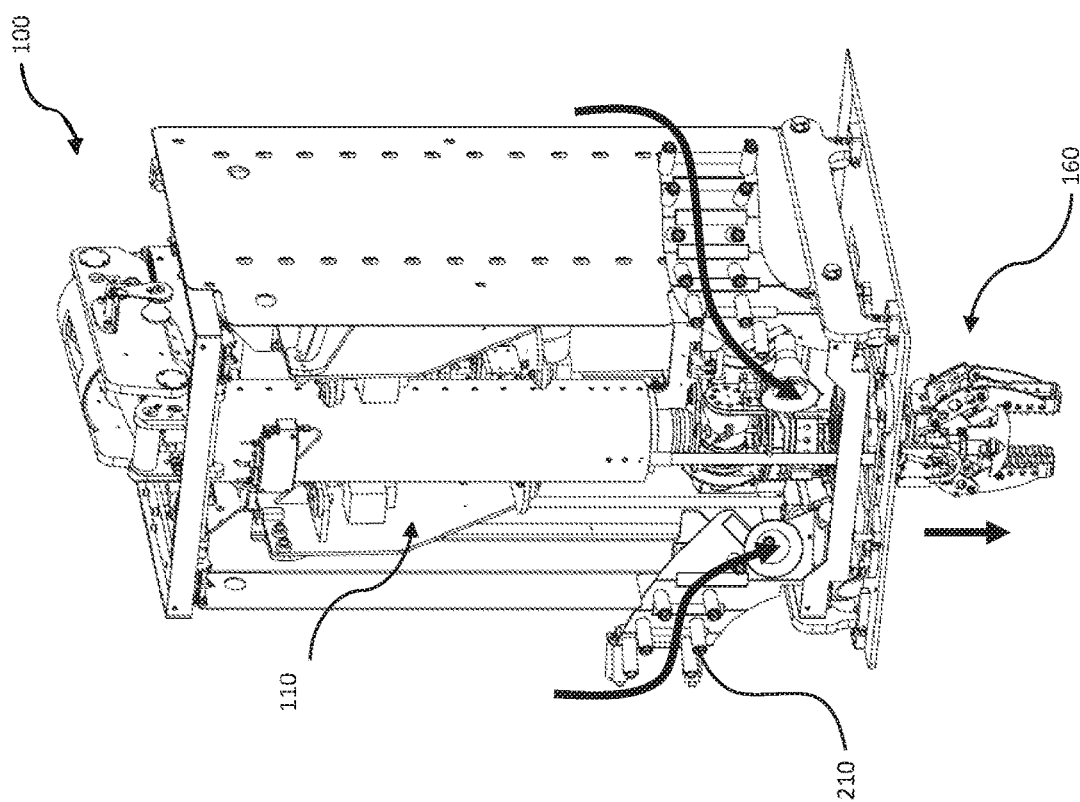
FIG. 11B depicts the insertion of an end effector into the RMA.
Figure 12:
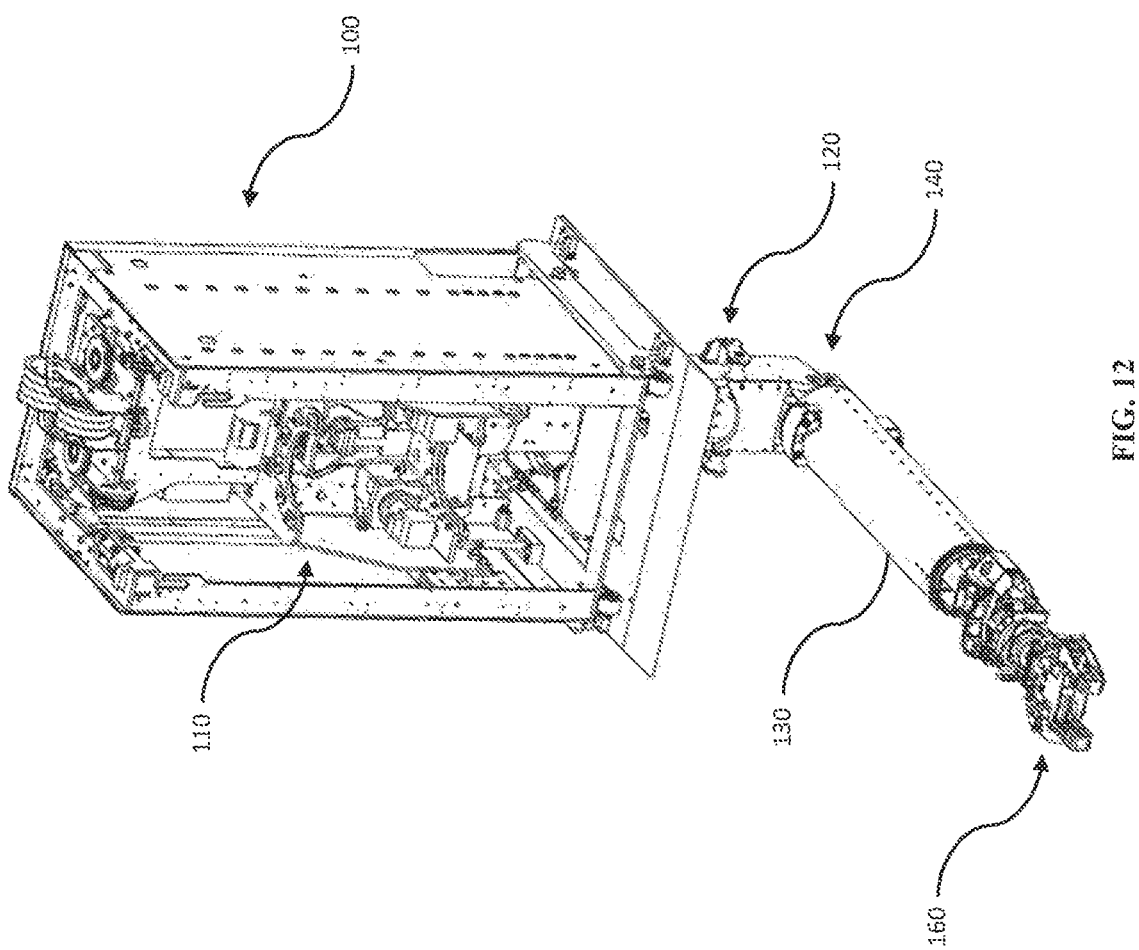
FIG. 12 depicts an end effector embodiment coupled to the RMA.
Figure 13:
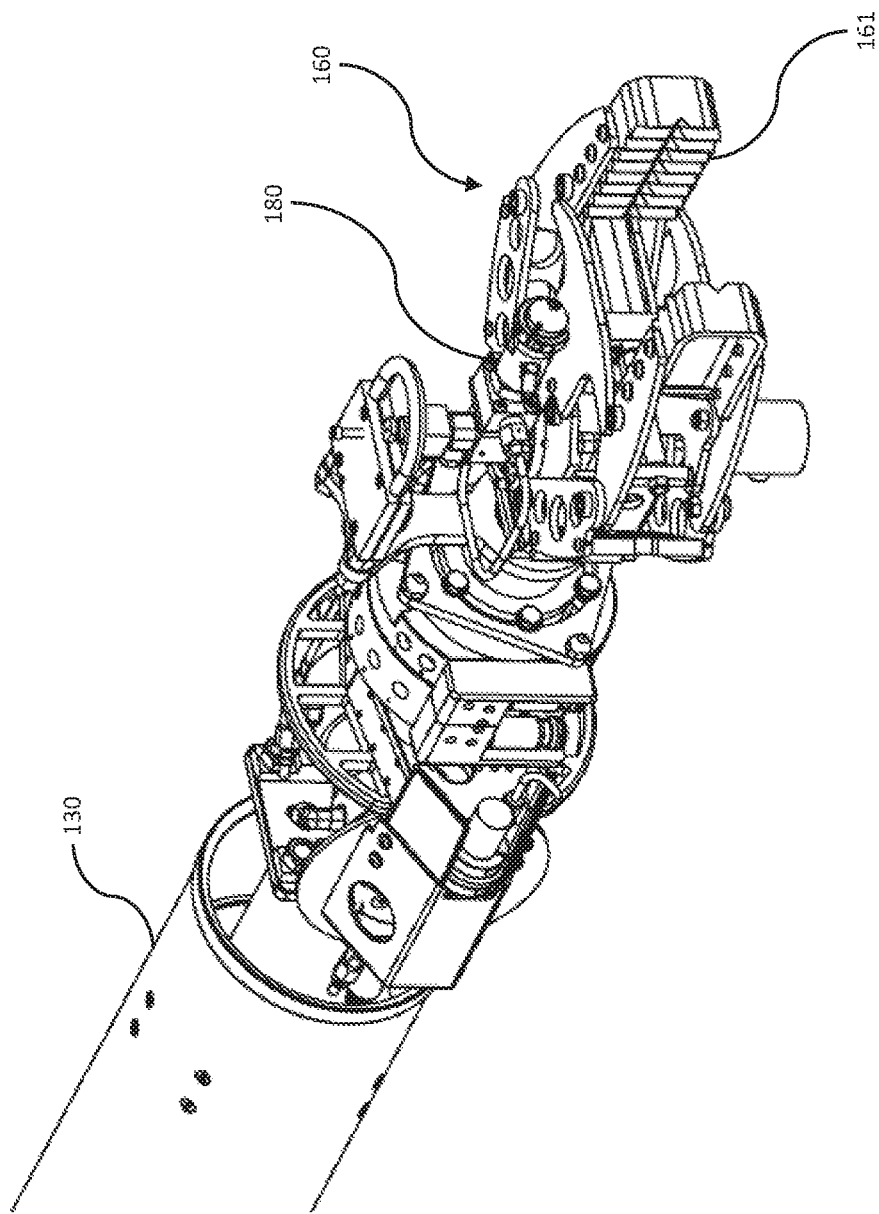
FIG. 13 depicts an isometric view of an end effector embodiment coupled with a waterjet tool.

FIGS. 11A through 11C depict an embodiment of a tool changing process. The end effector 160 is inserted under the RMA 100 with the use of a tool handling system 210. In this embodiment, the end effector 160 is placed in-line with the retracted forearm 130. As the mast 120 and/or the forearm 130 are extended, the wrist coupling mechanism 155 is engaged to the end effector coupling mechanism 165 and secures the end effector 160 to the forearm 130. FIG. 12 shows an embodiment of the RMA 100 coupled to an end effector 160. FIG. 13 depicts an isometric view of the end effector 160 and forearm 130 coupled with a waterjet tool 180.

In some embodiments, the tooling may be deployed into the workspace through separate access points which may be offset from the primary access point. In some embodiments, additional tools or end effectors may be placed in the workspace prior to RMA entry. In some embodiments, the tools and end effectors may be changed outside of the workspace.

Tools and end effectors may be lowered into the workspace using a hoist and/or pulley system embodiments. In some embodiments once a tool or end effector is secured to the RMA 100 using a wire rope, or other such connector, may be tensioned and retracted by the RMA 100 as needed. A wire rope, or other such connector, may be used to retrieve the end effector. A wire rope, or other such connector, may be wound on a spring tensioned spool, which may be motorized and/or manual. A spring reel may be provided in several tension ranges to adapt to various tool or end effector weights.

Hydraulic Power Unit

In some embodiments, the RMA comprises one or more hydraulic power units (HPU) to provide motive power for one or more hydraulic actuators. In some embodiments, hydraulic actuators include one or more of: elbow pivots, forearm extend, wrist pitch, wrist roll, and gripper open/close, among other things.

In some embodiments, an HPU may be controlled automatically by the control system during operations. The control system may automatically activate the hydraulic services upon a hydraulic service demand, and automatically control the HPU cooling system per hydraulic fluid temperature, in some embodiments. An HPU may include basic manual controls, in addition to the automatic controls, for flexible control as needed. In some embodiments, local manual control for the HPU may be provided to allow for recovery in case of a control system failure.

In an example embodiment, the HPU supplies hydraulic oil to all the hydraulic actuators at a maximum pressure of 2.9 ksi and a maximum flow rate of 3.96 gallons per minute. Other pressures and flow rates are possible. In some embodiments, hydraulic fluid levels may be monitored to detect leakage.

Wash-Down

In some embodiments, the RMA comprises an integrated wash-down system that is designed to remove contaminants from the RMA. In some embodiments wash-down occurs as the RMA is being retracted from the workspace thus capturing contaminants within the workspace. In some embodiments, the wash-down system may comprise one or more separate wash rings located within the RMA which allow pressurized water to be sprayed onto the RMA surfaces. Some embodiments incorporate three wash rings wherein one is located at the top of the mast, one is located at the bottom of the mast, and one is located inside the forearm. During retrieval, each of the wash rings may be pressurized in a series of steps to ensure full cleaning of all components, in some embodiments. In some embodiments, a high-pressure water supply may be used to run the wash-down system.

In some embodiments, at least some of the electrical componentry may be held to ingress protection (IP) 64 or higher to protect against overspray and fluids in the workspace. In some embodiments, all overspray and overflow may be captured by support frame containment covers and may drain from the bottom of a wash pan into the workspace. In the event of a drain blockage a float may automatically shut off the wash water in some embodiments.

Cable Management

Cables may run at least one of internally and externally the RMA. The term "cable" is intended to comprise electrical wiring, hydraulic hoses, pneumatic hoses, fiber optic cable, communications cable, or any other cables, wires, or lines as well as bundles thereof. The cables may be used to transfer/transmit data pertaining to sensing and/or control in the system or any extensions attached to the system. Additionally, cables may be included for materials transfer into and out of the workspace.

One or more services, in some embodiments, may be routed internally through one or more of the mast, elbow, and forearm. In some embodiments cable management may be accomplished using one or more of an external tensioned reel system, block-and-tackle system, and an internal cable chain. A block-and-tackle system may be under constant tension using systems such as constant force gas springs in some embodiments. In some embodiments, additional umbilical cables may be included for tools requiring separate power or control systems or additional sensor or signaling cables. The cable management system may allow cables to be feed in and out of the mast during extension and retraction, in some embodiments. This may be accomplished using a set of pulleys that may be tensioned with pneumatic cylinders, in some embodiments. Some embodiments may comprise one or more cable shrouds to prevent lines and cables from being pinched during actuation.

An embodiment of a cable management system for the RMA may incorporate a RolaTube® attached to a tether in proximity to the RMA similarly to the deployment retrieval tool disclosed in co-pending application System and Method for Inspection and Maintenance of Hazardous Spaces, Ser. No. 15/341,985 filed Nov. 2, 2016, with a priority date of Nov. 3, 2015, which is hereby incorporated by reference in its entirety. Some embodiments may comprise and support a tether containing services and material transfer lines between sections. This may reduce forces required for tether movement and prevent entanglement with internal infrastructure in the workspace.

In some embodiments one or more sensors or other devices may utilize wireless communication technologies such near field communication (NFC) and Bluetooth, among others. Wireless sensors and other devices may reduce the amount of cabling required thus increasing range, capability, and mobility of the system.

Sensing and Control

Control of the RMA is initiated by a control system. The control system may be one of local and remote to the RMA and the operating space. Monitoring and control operations may be performed locally, remotely, and/or may be mobile. Mobile monitoring and control may be implemented using one or more mobile devices such as smart phones, laptops, moveable desktop computer work stations, tablets, and wearable computing devices. In some embodiments one or more operators may be equipped with one or more wearable devices, or other mobile devices, that provide feedback to the operator(s). For instance, a vibration and/or audible alert may be used to provide warnings to an operator.

In some embodiments control may be affected using a master-slave manipulation system including a "man-in-the-loop" system. In such embodiments, an operator may control a master system that is remote to the workspace. As the operator moves and controls the master system, the slave system (the RMA) may respond instantly and exactly. One or more sensors located at least one of in the workspace and on the RMA may provide feedback to the operator. In some embodiments, one or more sensors on the RMA may provide haptic and other feedback to the operator to simulate any resistance or other forces acting on the RMA. In some embodiments, the RMA may not respond if the master directs it to perform a task that is not possible or will damage the RMA or the workspace. For instance, if the master directs the RMA to move outside of its range of motion or the extents of the workspace, it may move to the extent of its range of motion or the workspace and no further. Some embodiments may incorporate additional safety mechanisms such as the slave not responding if the master is moved too rapidly. In some embodiments, the master system is an exact replica, which may be scaled in size, of the slave system. In some embodiments, the master system is wearable, for instance on an operator's arm.

In some embodiments, a preliminary inspection is performed prior to engaging in other operations. Preliminary inspections may yield data that may be used to pre-program the RMA. To perform operations automatically. In some embodiments, operators may program an otherwise predetermined set of data into the RMA to perform operations automatically. In some embodiments, the workspaces) may be inspected after operations for quality control or other purposes. The controls for the end effectors and/or tools may be integrated into the controls for the RMA and/or stand-alone.

Virtual Barriers

In some embodiments, the operating space may be scanned using one or more sensors prior to operations to gather data which may be used to generate an electronic three-dimensional map of the operating space. When more than one sensor is used to gather data about the geometry of the operating space the data may be combined using known in the art sensor fusion techniques. Alternatively, or additionally, the three-dimensional map of the operating space may be manually generated using known information about the geometry of the space.

In some embodiments, the three-dimensional map may be visible to the operator on a user interface and/or stored in memory. The operator may set a global coordinate system and one or more local coordinate systems within the space. The purpose of a three-dimensional map of the operating space is to define the boundaries of the operating space and any infrastructure or objects in the space that may restrict the RMA's range of motion in the space. Knowledge of the geometry of the operating space may be used to pre-program the RMA to carry out operations automatically within the space and to avoid impact with objects in the space when carrying out operations manually.

One or more virtual barriers may be generated to prevent equipment from contacting surfaces and/or objects in the operating space to protect the integrity of both the RMA and the operating space. A three-dimensional map of the operating space defines the actual physical boundaries of the operating space. Virtual barriers define one more virtual operating zones, offset from the physical boundaries, in which operations may be safely carried out in the operating space without damage to the space or to the RMA. Virtual barriers are invisible "walls" generated either automatically by the control system using predetermined offset values and/or manually programmed or edited by an operator. Virtual barrier offset(s) may be programmed in a similar fashion as one would program the area of operations for a CNC machine.

Figure 14:
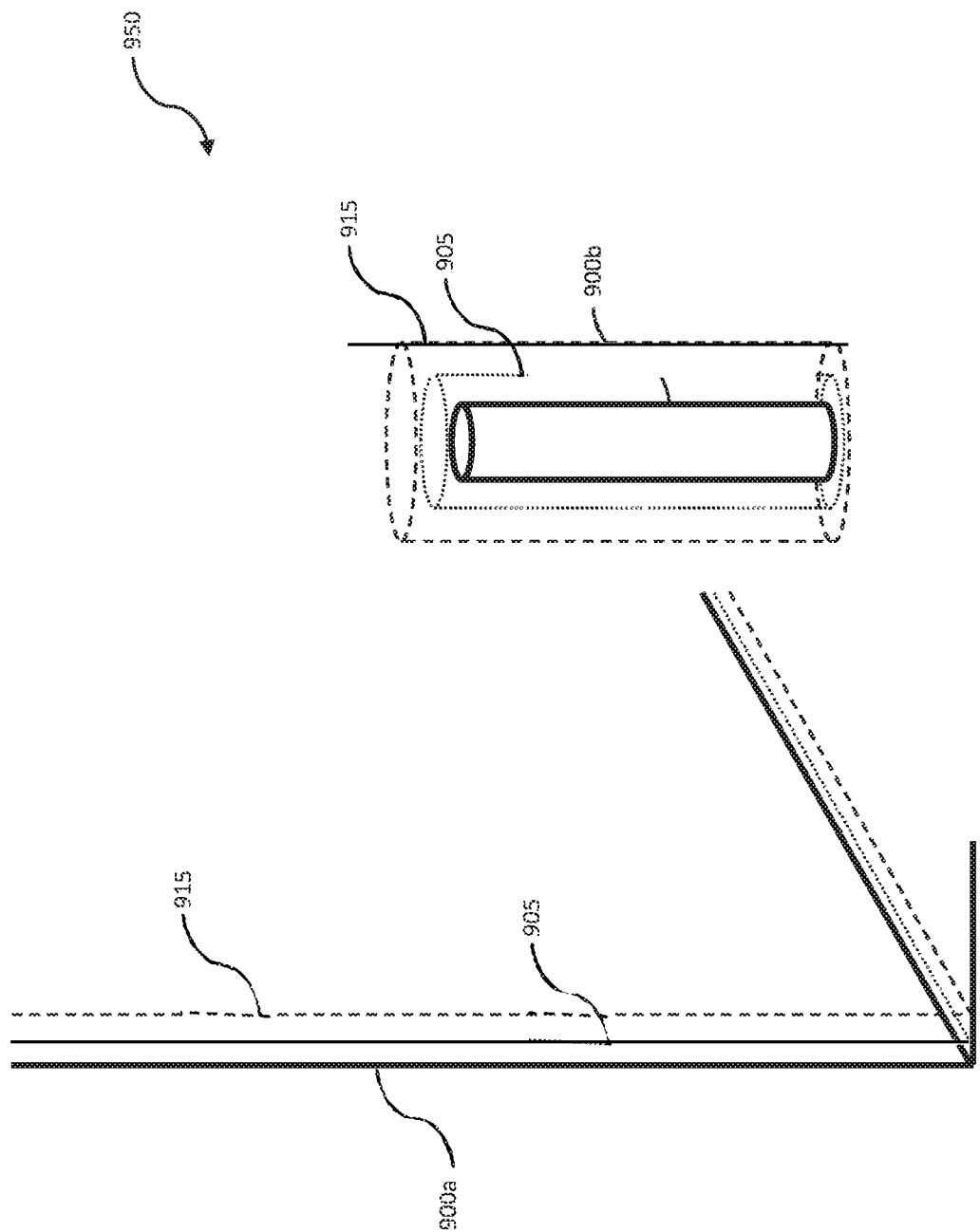
FIG. 14 is an example embodiment depicting virtual barriers in an operating space.

An example virtual barrier embodiment is depicted in FIG. 14. In some embodiments, an impermeable virtual barrier 905 may be offset from one or more of the surfaces 900a,b in the operating space 950 and may serve to prevent the RMA from advancing any closer to the one or more surfaces 900a,b. In some embodiments, an impermeable virtual barrier 905 may be set at a minimum allowable distance from the one or more surfaces 900a,b at which operations may be safely performed. In the depicted embodiment virtual barriers are offset from a wall 900a and an object 900b in the operating space 950. In some embodiments, a permeable virtual barrier 915 may be offset from an impermeable virtual barrier 905 or from one or more surfaces 900a,b in the operating space 950 and may serve to provide haptic feedback and/or a warning to an operator when encountered. The warning may be one of haptic, audial, and/or visual. In some embodiments, the warning may increase in intensity as the RMA, moves farther into the permeable virtual barrier 915.

In some embodiments, the haptic feedback may be in the form of resistance. For instance, as the RMA traverses through the permeable virtual barrier 915 the resistance may increase until the RMA encounters either an impermeable virtual barrier 905 or the resistance is insurmountable. In some embodiments one or more virtual barriers may be generated automatically using predetermined values and/or manually generated by an operator. The offsets of the virtual barriers from surfaces and each other may be uniform throughout or variable. In the depicted embodiment the virtual barriers are offset farther from the object 900b than from the wall 900a. The one or more virtual barriers may be visible on a display.

Interface

Figure 15:
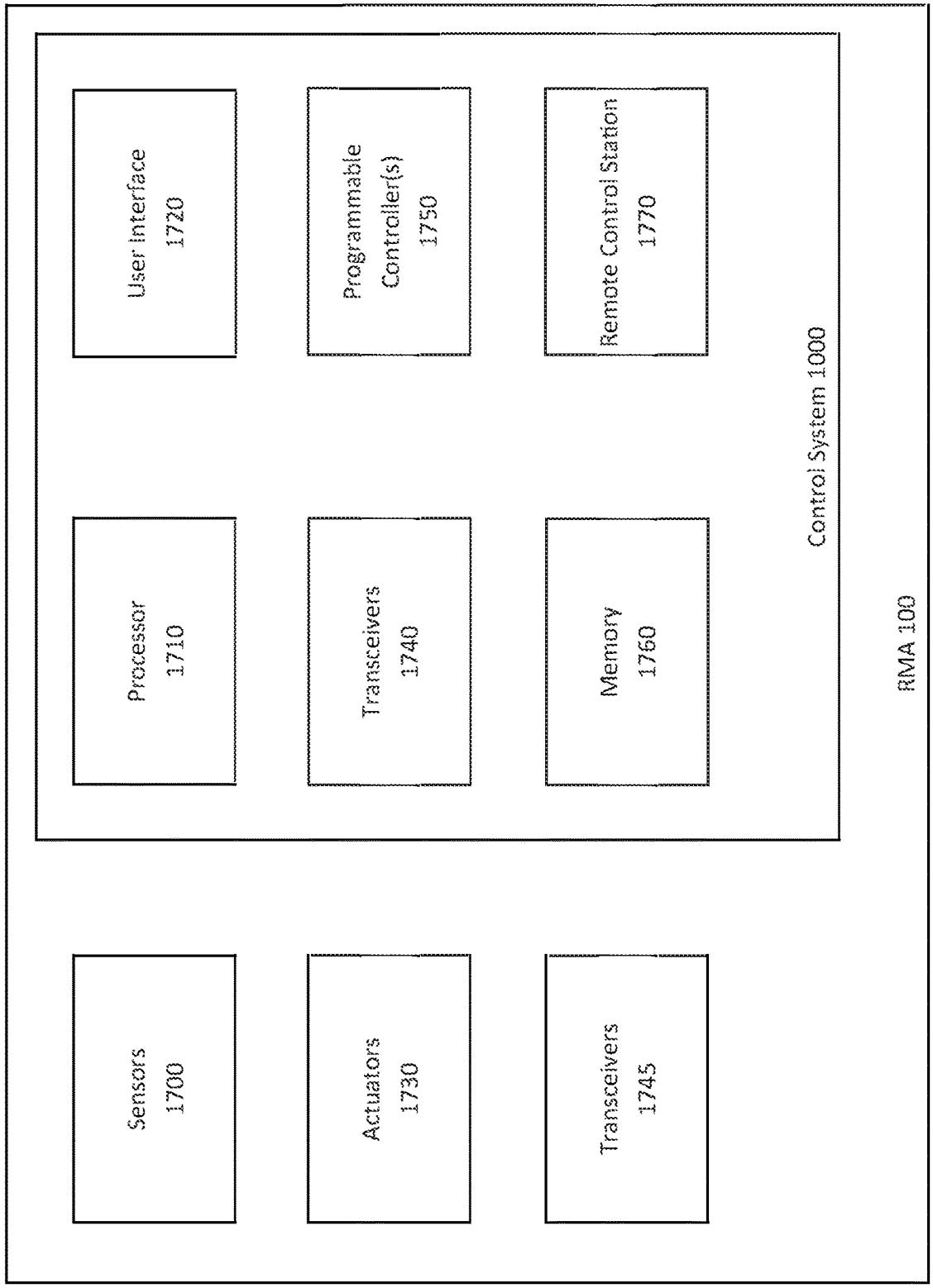
FIG. 15 depicts an embodiment of a control system.

An embodiment of the control system 1000 is depicted in FIG. 15. The RMA 100 may comprise one or more sensors 1700, one or more actuators 1730, one or more transceivers 1745, and a control system 1000. The control system 1000 may comprise one or more processors 1710, one or more user interfaces 1720, one or more transceivers 1740, one or more programmable controllers 1750, a memory 1760, and one or more remote control stations 1770. A programmable controller 1750 provides for a flexible means of manipulation of the RMA 100 and/or tools allowing for a best-fit control solution for the equipment. The one or more remote control stations 1770 may provide custom operator interfaces. The one or more interfaces 1720 may comprise one or more of displays, touchscreens, joysticks, buttons, toggles, switches, and voice input for equipment control. In some embodiments, the interface 1720 may be projected such that an operator may operate the RMA from inside a virtual 3D map of the operating space.

More detail on possible control system and actuator embodiments is described in Systems and Methods for Chain Joint Cable Routing, Ser. No. 14/975,544 filed Dec. 18, 2015, with a priority date of Dec. 29, 2014, which is hereby incorporated by reference in its entirety.

In some embodiments, the control system may require one or more forms of authentication from the operator in order to function. In some embodiments, if the control system loses confidence that an operator is properly authenticated, such as if it has not been tasked within a predetermined period, it may require the operator to re-authenticate.

Modes of Operation

In some embodiments, control methods may comprise one or more of joint-by-joint actuation and inverse kinematic actuation. Inverse kinematics allows an operator to control the gripper/tool position, and the control system determines the joint movements to achieve that position. In some embodiments control is operator-initiated individual variable speed joint control. In some embodiments, joint control may be either push-and-hold type or bump time-based type depending on the operation being performed.

In some embodiments, the control system 1000 may comprise a flexible and robust control interface. The interface may comprise two or more modes of control providing appropriate control for the various normal and potential off normal operations of the equipment. The primary design constraint that provides the ability for the control system 1000 to potentially perform various high level functions may be the integrated position feedback on the RMA axes. With the information of the RMA configuration, the control system can perform inverse kinematic and kinematic calculations. Two basic modes of operation for the control system are joint control mode and inverse kinematic control mode.

In some embodiments, joint control mode may provide an open-loop control for a singular axis. An operator may select the desired axis to control on a control interface. Control for the selected axis may be provided by a joystick, or other input device and/or interface. Joint control mode may be used during recovery operations, calibration operations, and off-normal operations where the inverse kinematic control hinders the operator ability to perform a task. Open loop joint control mode allows the removal of the RMA in the event of a position sensor failure.

In some embodiments, closed-loop inverse kinematic control mode may provide simultaneous x/y/z control of a tool/end effecter to the operator. Inverse kinematic control allows an operator to control the orientation of a tool/end effector relative to the floor, or other fixed infrastructure in the workspace, and allows the operator to control the position of the tool/end effector (Cartesian coordinate frames) inside the workspace.

The RMA and tools may be manually or automatically operated. In some embodiments, some functions are automatic and some are manual. The RMA in some embodiments may offer variable speed control for each joint, with an overall adjustable maximum speed.

Interlocks

In some embodiments, the RMA may comprise one or more interlocks to ensure efficient, proper, and safe equipment operations. In some embodiments, these interlocks vary in seriousness and indicated awareness to the operator. In some embodiments, there are three types of interlocks comprising alarms, warnings, and operational.

In some embodiments alarms may stop system operations that may risk equipment health and may generally cause some sort of display, haptic, and/or auditory feedback to an operator. The control system alarm may be visually displayed on an interface and status of the system alarms provided, in some embodiments. In some embodiments alarms may require operator acknowledgement and resolution before the system can become operational again. In some embodiments, alarms may remain active and non-resettable if the existing alarm condition is active.

In some embodiments warnings may comprise display, haptic, and/or auditory feedback to an operator but may not cause the RMA to suspend operations. Operational interlocks may be performed by the control system to ensure proper equipment health during normal operations. In some embodiments, operational interlocks may not be identified to an operator and are typically performed in the background. For example, a hydraulic power unit may integrate a cooling interlock that activates/deactivates a fan depending on the fluid temperature. This interlock may occur in the normal operating logic of the system.

The control system may provide equipment interlocks as necessary (when considering desired control options and equipment feedback) to improve equipment health and operations. In some embodiments, control system interlocks may be segregated into three primary levels:

Equipment Enable Interlock—An interlock for healthy operations for all operations (e.g., emergency stop)

Equipment Normal Operations Interlock—An interlock for normal operations but is potentially not required for off normal operations (e.g., hydraulic level low)

Equipment Operation Specific Interlock—An interlock for a specific sub operation (e.g., during initial deployment operations locking the gripper in closed position during deployment)

In some embodiments, the control system may include an emergency stop system that removes all motive power from the equipment once tripped. In some embodiments, the emergency stop system does not remove power from the control and monitoring equipment. In some embodiments, an emergency stop system allow for operational feedback during the emergency stop condition. After an emergency stop, the system may need to be reset by an operator to be functional. Although the equipment may stop or shut down, the control system may remain operational in some embodiments, which allows for alerts to occur and troubleshooting actions. The control system design in some embodiments provides electrical disconnect switches at electrical service input points to allow for equipment isolation. The control system meets electrical standards to ensure equipment safety, and allows the electrical hydraulic, and mechanical components to fail to a safe state upon the loss of services.

Sensors

In some embodiments, the RMA 100 may comprise one or more sensors. The one or more sensors may comprise one or more of contact sensors, non-contact sensors, capacitive sensors, inductive sensors, 3D imagers, cameras, thermal imagers, thermometers, pressure sensors, accelerometers, inertial measurement units (MU), rotary encoders, resolvers, string encoders, radiation detectors, LIDAR, microphones, force sensors, load sensors, and strain sensors, among others. In some embodiments, one or more sensors may be used to determine the position of the deployed tools during operations. In some embodiments, one or more sensors may be used to monitor at least one of strain, torque, pressure, and environmental conditions at one or more locations in the system as a safety mechanism to prevent catastrophic failures.

In some embodiments, the RMA 100 may include one or more imaging sensors. The one or more imaging sensors may comprise one or more of 3D imaging, 2D range sensor, camera, thermal imager, and radiation detector, among others. One or more imaging sensors may be used to provide inspection and monitoring capabilities for remote operators. Signals from one or more imaging sensors may be displayed in real-time, recorded for later review, and/or recorded for operational records. In some embodiments one or more imagers may be mounted to, or in proximity to, an end effector to allow a close-up view of operations. In some embodiments one or more imagers may be mounted in the workspace. Any one or more of the imagers may be one of fixed or pan-tilt-zoom types. Any one or more of the imagers may be controlled remotely by an operator or preset to follow input movement patterns or rules.

The operator may select and manage desired imager views for operations, controlling the imagers with associated control features such as the pan, tilt, zoom (PTZ), focus, and lights. In some embodiments, one or more imagers may provide complete visual coverage of operations in the workspace. One or more imagers may be used for visual collision avoidance during operations. Audio feedback to the operators may be provided from any one or more locations in the workspace and/or from one or more locations on the RMA 100.

One or more sensors may be included in the RMA 100 to detect contact with infrastructure and/or other surfaces in the workspace. In some embodiments, one or more sensors may be a six-axis sensor capable of relaying the direction and magnitude of an impact back to an operator and/or other personnel. In some embodiments one or more sensors may serve as a proximity warning system to prevent contact with infrastructure and/or other surfaces in the workspace. In some embodiments, the control system will not process inputs that may damage the equipment or the workspace.

In some embodiments extension and/or velocity of extendable components in the system, such as the forearm and/or mast, may be measured using one or more string potentiometers. The mast rotate may be operated by an electric geared motor attached to a turntable bearing and use a resolver for position feedback, in some embodiments, lighting may be provided at one or more locations in the workspace and/or at each imager position.

Figure 16:
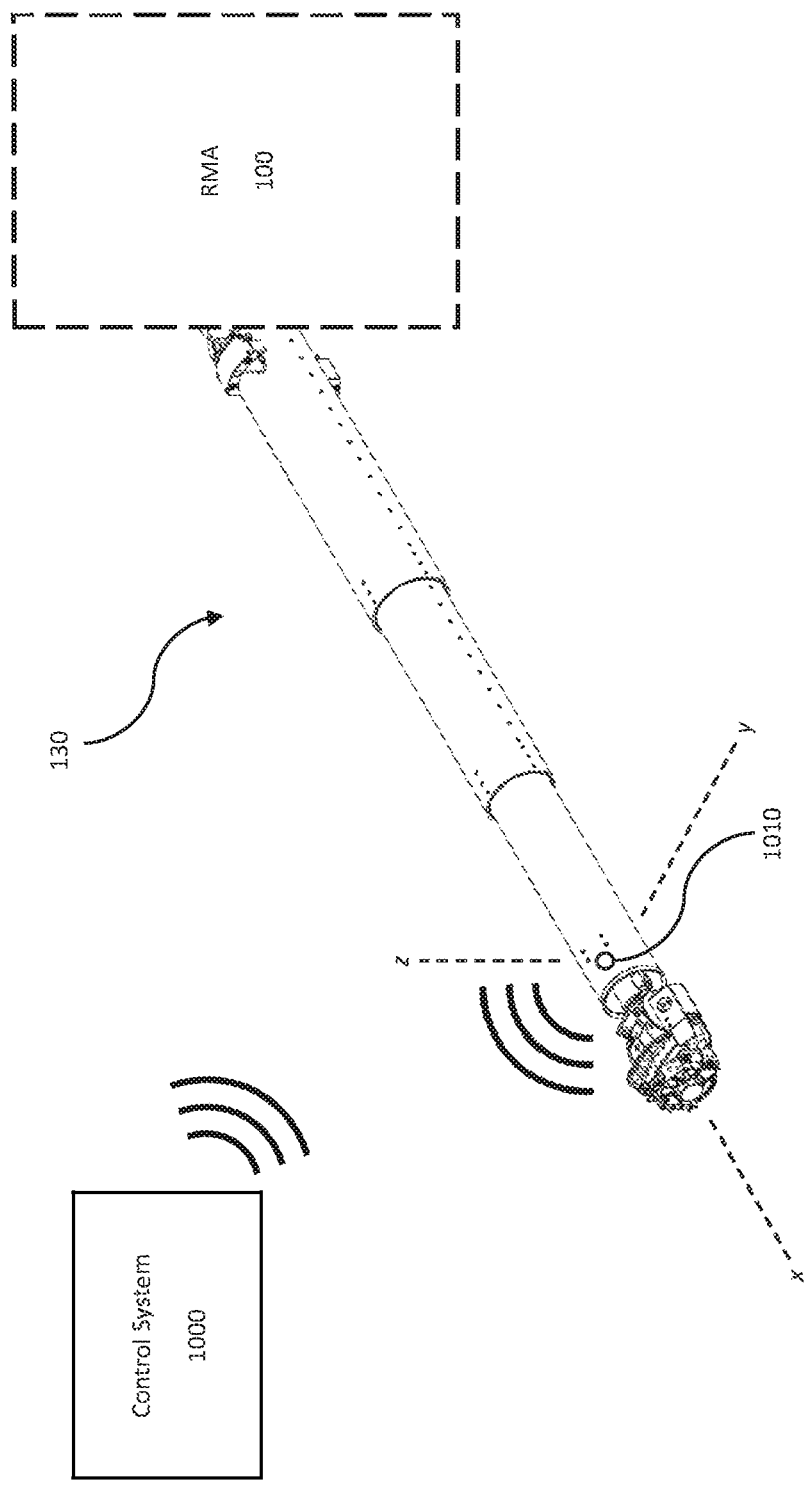
FIG. 16 depicts an embodiment of the forearm comprising sensors.

In some embodiments, such as the embodiment depicted in FIG. 16, the RMA 100 comprises a dynamic measurement unit 101.0 wherein the dynamic measurement unit 1010 comprises one or more accelerometers and one or more rate sensors. In some embodiments, the RMA 100 comprises one or more non-contact sensors affixed to at least one of the forearm 130, mast, and elbow. In the depicted embodiment a non-contact sensor is collocated with the dynamic measurement unit 1010 on the forearm 130. A dynamic measurement unit 1010 may be configured as a six degree of freedom three axis sensor configured to operate in a Cartesian coordinate system. In some embodiments, the dynamic measurement unit 1010 comprises three accelerometers and three rate sensors where the accelerometers and rate sensors are paired and each pair is oriented along each axis in a Cartesian coordinate system.

In some embodiments, one or more non-contact sensors (not depicted) affixed to at least one of the forearm 130, mast, and elbow report object measurements in the operating space in a polar reference frame, as range and azimuth or bearing to an object and/or surface. The controller 1000 in some embodiments computes and displays the objects and/or surfaces in the operating space in a Cartesian reference frame of x, y, and z. This is done for the operator to present a more intuitive view of the operating space in three dimensions so it is it is easier to understand and visualize. Therefore, in some embodiments, the non-contact sensor data will be converted to the Cartesian reference frame before it is used.

The standard conversion from the polar to the Cartesian reference frame is:

$$x_m = r_m \cos \theta_m \text{ and } y_m = r_m \sin \theta_m, \quad (1)$$

where $r_m$ and $\theta_m$ are the range and bearing, respectively, of the sensor target in the polar reference frame and $x_m$ and $y_m$ are the downrange and cross range coordinates, respectively, in the converted Cartesian reference frame. However, when dealing with the statistics of the measurements, mean and variance, one cannot use the above equations to directly transform from the polar to the Cartesian frames.

However, if there is concern regarding the uncertainty of the measurements in terms of variance in the range and the bearing measurements, additional steps must be considered in the translation. In the case of variance during the conversion, the standard conversion will not generate a perfect ellipsoid of the error envelop. In order to do so there may be debiased correction term subtracted from (Equation 1) to get a better value for the range and bearing measurements.

Debiasing the standard conversion is generally well understood in the art, and is well published and described. The following equations give the debiased conversion from a polar coordinate frame to a Cartesian reference frame:

$$x^{dc} = r_m \cos \theta_m - E[\tilde{x}|r_m, \theta_m], \quad (2)$$

$$y^{dc} = r_m \sin \theta_m - E[\tilde{y}|r_m, \theta_m], \quad (3)$$

where $x^{dc}$ and $y^{dc}$ are the final downrange and cross range debiased conversion coordinates of the sensor target and $$E[\tilde{x}|r_m, \theta_m] = r_m \cos \theta_m \left(e^{-\sigma_\theta^2/2}\right), \quad (4)$$

$$E[\tilde{y}|r_m, \theta_m] = r_m \sin \theta_m \left(e^{\sigma_\theta^2} - e^{\sigma_\theta^2/2}\right), \quad (5)$$

The covariance matrix, $R_a$, for the downrange and cross range coordinates are $$R_a^{11} = \text{var}(\tilde{x}|r_m, \theta_m) = r_m^2 e^{-2\sigma_\theta^2} [\cos^2\theta_m(\cos h\, 2\sigma_\theta^2 - \cos h\, 2\sigma_\theta^2) + \sin^2\theta_m(\sin h\, 2\sigma_\theta^2 - \sin h\, \sigma_\theta^2)] + \sigma_r^2 e^{-2\sigma_\theta} [\cos^2\theta_m(\cos h\, \sigma_\theta^2 - \cos h\, \sigma_\theta^2) + \sin^2\theta_m(\sin h\, 2\sigma_\theta^2)] \quad (6)$$

$$R_a^{22} = \text{var}(\tilde{x}|r_m, \theta_m) = r_m^2 e^{-2\sigma_\theta^2} [\sin^2\theta_m(\cos h\, \sigma_\theta^{-\cos}h\sigma_\theta^2) + \cos^2\theta_m(\sin h\, 2\sigma_\theta^2 - \sin h\, \sigma_\theta^2)] + \sigma_r^2 e^{-2\alpha^{\theta^2}} [\sin^2\theta_m(2 \cos h\, 2\sigma_\theta^2 - \cos h\, \sigma_\theta^2) + \cos^2\theta_m(2\sin h\, \sigma_\theta^2 - \sin h\, \sigma_\theta^2)], \quad (7)$$

$$R_a^{12} = \text{cov}(\tilde{x}\tilde{y}|r_m, \theta_m e^{-4\sigma\theta^2}[\sigma_r^2 + (r_m^2 + \sigma_r^2)(1 - e^{-\sigma_\theta^2})] \quad (8)$$

where $\sigma_r^2$ and $\sigma_\theta^2$ are the variances of the range and bearing, respectively, in the sensor polar reference frame.

Equipment Power-Up

Upon the application of electrical services, the control system may power up in an equipment motive safe state in some embodiments. With the electrical services provided, the start-up of the equipment control may require operator initiation or emergency stop system reset and alarm reset at the operator interface. Operator initiation of the system may ensure that personnel are aware of the equipment status and state prior to operations.

Equipment Shutdown

In some embodiments, the control system may allow for the equipment to be shut down in a motive-safe state by the triggering of an emergency stop circuit, The design of the control system in some embodiments ensures the equipment fails in a safe state upon the removal of motive power by emergency stop circuit or removal of electrical services. A non-powered fail-safe design allows for a hard equipment shutdown, such as an electrical disconnect and isolation.

Recovery

In some embodiments, the control system may provide an off normal operations mode for recovery operations in the event of a failure. Equipment recovery through the user interface may be the primary mode of equipment recovery for difficult to access operating areas. If the equipment cannot be recovered through the user interface (e.g., if the programmable controller failed), the operator may then implement a hydraulic or manual mechanical means for recovery.

Non-Transitory Computer Readable Medium

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in the present disclosure may be implemented or performed with a general-purpose processor, a digital signal processor (DSP), an application specific integrated circuit (ASIC), a field programmable gate array signal (FPGA) or other programmable logic device PLD), discrete gate or transistor, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of two computing components, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some respects, a computer readable medium may comprise non-transitory computer readable medium (e.g., tangible media). In addition, in some aspects a computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. Processes or steps described in one implementation can be suitably combined with steps of other described implementations.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD)), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CI)) or floppy disk, etc.), such that a user terminal and/or base station can obtain the various methods upon coupling or providing the storage means to the device.

It is to be understood that the claims are not limited to the precise configuration and components illustrated above. Various modifications, changes and variations may be made in the arrangement, operation and details of the methods and apparatus described above without departing from the scope of the claims.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the systems, methods, processes, and/or apparatuses disclosed herein in a preferred embodiment thereof, it should be apparent that the systems, methods, processes, and/or apparatuses may be modified in arrangement and detail without departing from such principles. Claim is made to all modifications and variation coming within the spirit and scope of the following claims.

What is claimed is:
1. A robotic arm control system, comprising:
a robotic arm configured to deploy one or more tools in an operating space;
one or more sensors; and
a control system operably configured to:
identify one or more surfaces defining the operating space with the one or more sensors,
generate a three-dimensional map of the operating space based at least in part on the one or more surfaces defining the operating space, establish an impermeable virtual barrier offset from one or more surfaces in the operating space, wherein the impermeable virtual barrier offset is at least one of variable or uniform, and establish a permeable virtual barrier offset from the impermeable virtual barrier.

2. The system of claim 1, wherein the impermeable virtual barrier offset is a minimum allowable distance in which operations may be performed.

3. The system of claim 1, wherein the impermeable virtual barrier prevents the robotic arm from advancing beyond the impermeable virtual barrier.

4. The system of claim 1, wherein the permeable virtual barrier, when encountered, generates at least one of a warning and haptic feedback to an operator.

5. The system of claim 4, wherein the haptic feedback is in the form of resistance.

6. The system of claim 5, wherein the resistance increases as the robotic arm approaches the impermeable virtual barrier.

7. The system of claim 1, wherein the control system is configured to allow an operator to remotely control the robotic arm.

8. The system of claim 1, wherein the one or more sensors are carried by the robotic arm.

9. The system of claim 1, wherein the control system is further operably configured to combine data received from the one or more sensors.

10. A method of controlling a robotic arm, the method comprising:

providing a robotic arm configured to deploy one or more tools in an operating space;

identifying one or more surfaces defining the operating space with one or more sensors;

receiving signals from the one or more sensors indicative of geometry of the operating space;

establishing an impermeable virtual barrier based at least in part upon the signals offset from the one or more surfaces defining the operating space, wherein the impermeable virtual barrier offset is at least one of variable or uniform; and establishing a permeable virtual barrier offset from the impermeable virtual barrier.

11. The method of claim 10, wherein establishing the impermeable virtual barrier includes establishing an impermeable virtual barrier that is offset from the one or more surfaces by a minimum allowable distance in which operations of the robotic arm may be performed in the operating space.

12. The method of claim 10, further comprising limiting the robotic arm from advancing beyond the impermeable virtual barrier.

13. The method of claim 10, further comprising generating a warning to an operator when the robotic arm encounters the permeable virtual barrier.

14. The method of claim 13, wherein the warning comprises haptic feedback.

15. The method of claim 14, further comprising increasing resistance to control the robotic arm in at least one manner when the robotic arm encounters the permeable virtual barrier.

16. The method of claim 15, further comprising further increasing resistance to control the robotic arm in the at least one manner when the robotic arm has passed the permeable virtual barrier and approaches the impermeable virtual barrier.

17. The method of claim 10, wherein the one or more sensors are carried by the robotic arm.

18. The method of claim 10, further comprising generating a three-dimensional map of the operating space based at least in part upon the signals from the one or more sensors.

19. A robotic arm control system, comprising:

a robotic arm configured to deploy one or more tools in an operating space;

one or more sensors; and a control system operably configured to:
identify a surface defining the operating space based at least in part upon information sensed by the one or more sensors, establish a virtual barrier offset from the surface, wherein the offset is at least one of variable or uniform, and limit movement of the robotic arm based at least in part upon the virtual barrier.

20. The system of claim 19, wherein the control system is further configured to generate a three-dimensional map of the operating space based at least in part upon information sensed by the one or more sensors.

\* \* \* \* \*